(12) United States Patent
Kondo et al.

(10) Patent No.: US 7,385,650 B2
(45) Date of Patent: Jun. 10, 2008

(54) DEVICE AND METHOD FOR PROCESSING IMAGE SIGNAL, PROGRAM FOR PERFORMING THE METHOD, AND COMPUTER-READABLE MEDIUM FOR RECORDING THE PROGRAM

(75) Inventors: Tetsujiro Kondo, Tokyo (JP); Nobuyuki Asakura, Tokyo (JP); Takeharu Nishikata, Chiba (JP); Takuo Morimura, Kanagawa (JP); Kei Hiraizumi, Kanagawa (JP); Hirosuke Nagano, Kanagawa (JP); Sakon Yamamoto, Tokyo (JP)

(73) Assignee: Sony Corporation (JP)

( * ) Notice: Subject to any disclaimer, the term of this patent is extended or adjusted under 35 U.S.C. 154(b) by 568 days.

(21) Appl. No.: 10/537,637

(22) PCT Filed: Dec. 12, 2003

(86) PCT No.: PCT/JP03/15977

§ 371 (c)(1),
(2), (4) Date: Jun. 3, 2005

(87) PCT Pub. No.: WO2004/055775

PCT Pub. Date: Jul. 1, 2004

(65) Prior Publication Data

US 2006/0038920 A1    Feb. 23, 2006

(30) Foreign Application Priority Data

Dec. 13, 2002  (JP)  ............................. 2002-362666

(51) Int. Cl.
*H04N 5/44* (2006.01)
*H04N 9/74* (2006.01)

(52) U.S. Cl. ...................... 348/561; 348/581

(58) Field of Classification Search ................ 348/561, 348/562, 581, 582, 451, 452, 448, 441, 458, 348/620, 621; 382/298–300; *H04N 5/44, H04N 9/74*
See application file for complete search history.

(56) References Cited

U.S. PATENT DOCUMENTS 5,973,740 A * 10/1999 Hrusecky ................ 375/240.15
6,795,581 B1 * 9/2004 Nomura ....................... 382/232

FOREIGN PATENT DOCUMENTS

JP       07-067031 A       3/1995
JP       07-32634 U        6/1995

(Continued)

*Primary Examiner*—Sherrie Hsia
(74) *Attorney, Agent, or Firm*—Lerner, David, Littenberg, Krumholz & Mentlik, LLP

(57) ABSTRACT

A device for processing an image signal that can improve an image quality of a zoom image, in which based on an input image signal, an image-signal-processing section produces an output image signal to display the zoom image with an expansion rate of an image being changed consecutively around an arbitrary center point specified by the user. Each pixel data of the output image signal is calculated by using coefficient data produced by a coefficient production circuit that produces the coefficient data based on not only phase information of each pixel but also resolution adjustment information and noise suppression degree adjustment information that the image quality adjustment information generation circuit generates based on the expansion rate of the image, a change rate (K) of the expansion rate of the image, and characteristics information of the image.

18 Claims, 18 Drawing Sheets

FOREIGN PATENT DOCUMENTS

| | | |
|---|---|---|
| JP | 09-083863 A | 3/1997 |
| JP | 2002-196797 A | 7/2002 |
| JP | 2002-223374 A | 8/2002 |
| JP | 2002-223420 A | 8/2002 |
| JP | 2002-300538 A | 10/2002 |
| JP | 2002-300617 A | 10/2002 |
| JP | 2003-198989 A | 7/2003 |

* cited by examiner

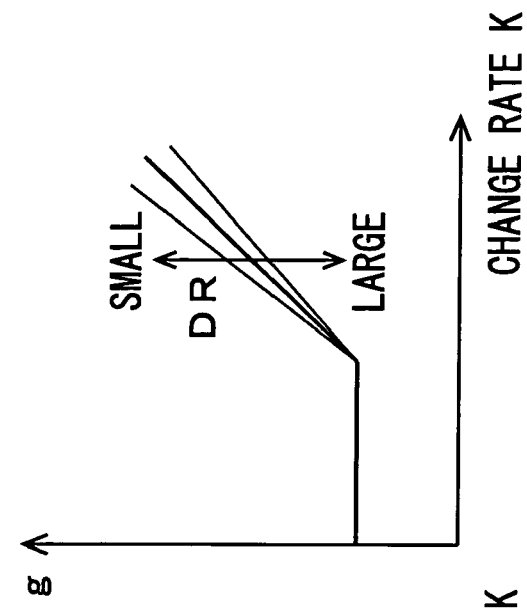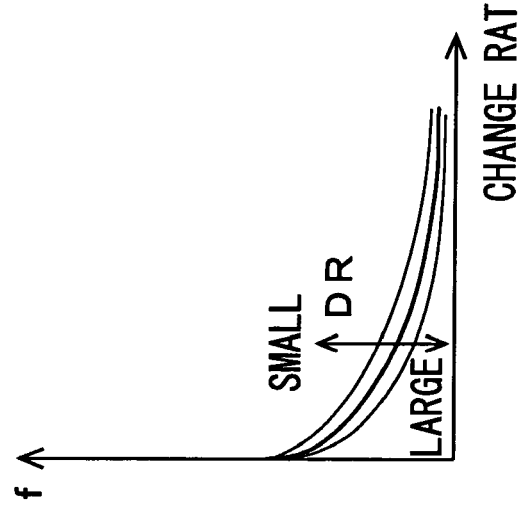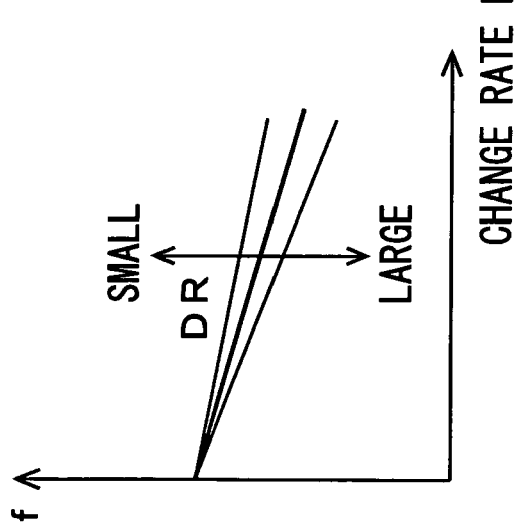

FIG. 11
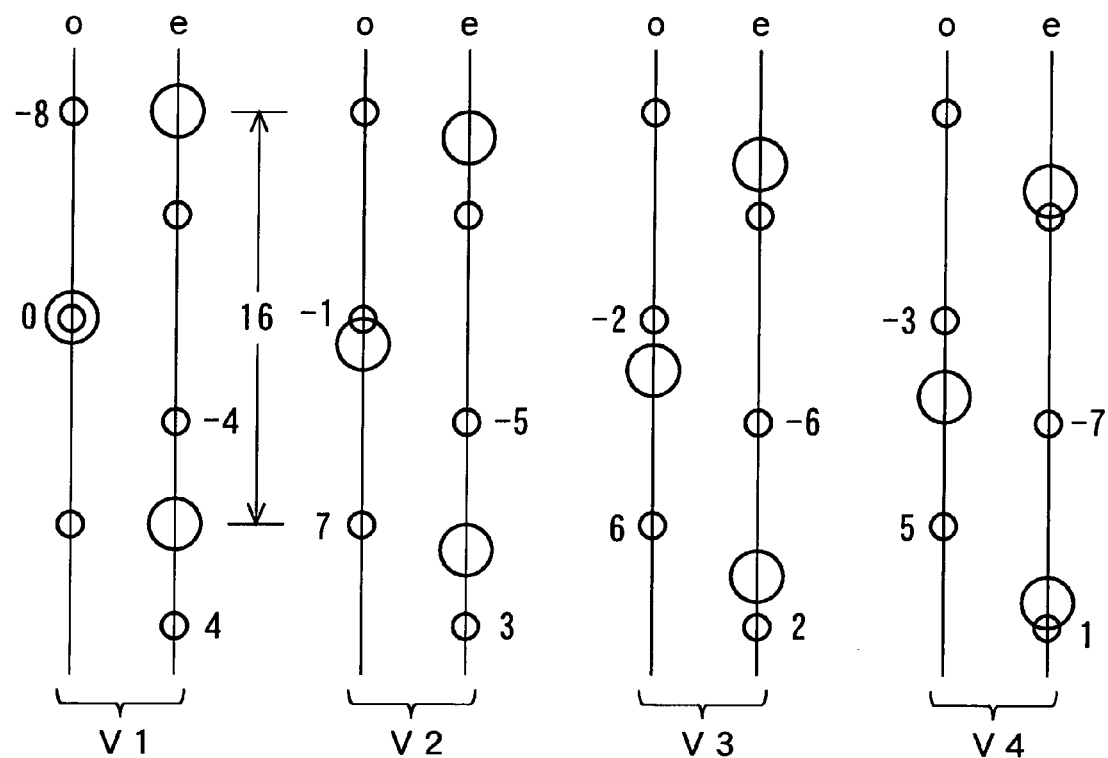
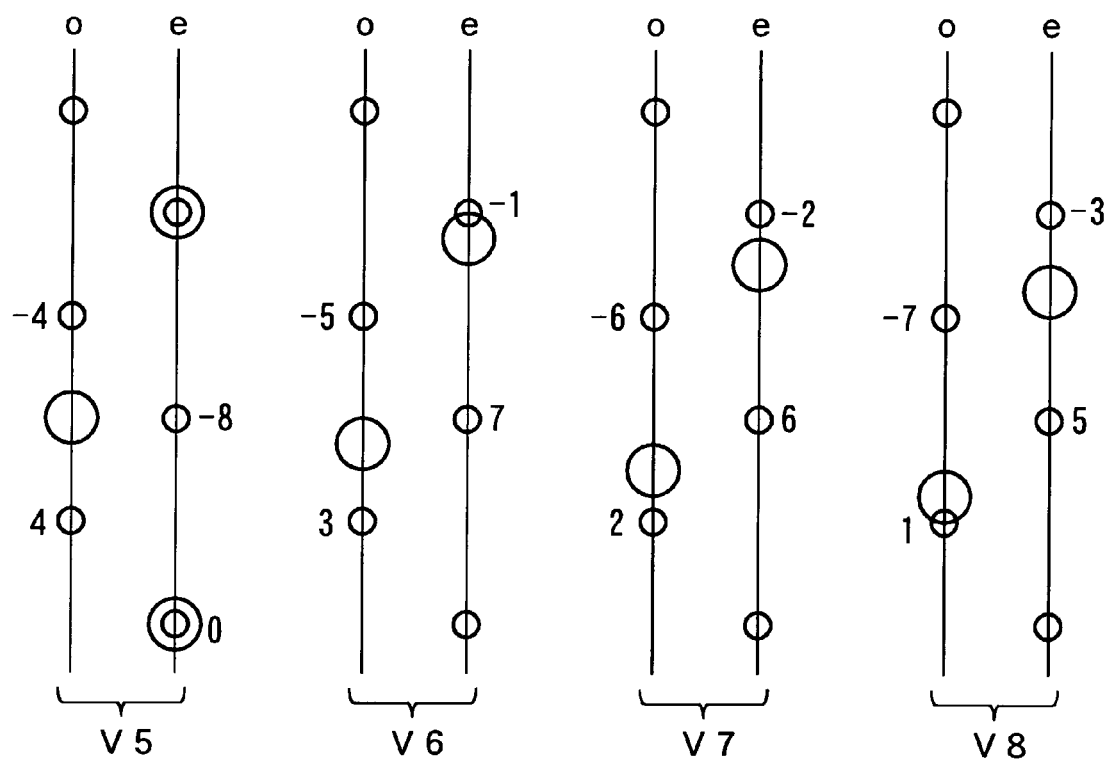

○ ◍ 1050i

◯ 525i

DEVICE AND METHOD FOR PROCESSING IMAGE SIGNAL, PROGRAM FOR PERFORMING THE METHOD, AND COMPUTER-READABLE MEDIUM FOR RECORDING THE PROGRAM

TECHNICAL FIELD

The present invention relates to device and method for processing an image signal, a program for performing the method, and a computer-readable medium for recording the program that could well be applied to display of images (zoom images) having consecutively varying image expansion rates (image size).

More specifically, the invention relates to the device for processing an image signal etc. that improve a zoom image by adjusting an image quality of an image due to an output image signal by using image quality adjustment information generated on the basis of information on at least an expansion rate of this image.

BACKGROUND ART

To convert an expansion rate of an image, it is necessary to obtain an output image signal by determining pixel data having a phase different from that of pixel data of an input image signal. In this case, by using an expansion rate of the post-conversion image, a phase relation of a pixel of the output image signal with respect to a pixel of the input image signal is determined uniquely.

Conventionally a method has been proposed by which when obtaining pixel data of an output image signal from pixel data of an input image signal in order to convert an expansion rate of an image, coefficient data for an estimate equation that corresponds to each phase of a pixel of the output image signal with respect to a pixel of the input image signal is stored in a memory beforehand and read to obtain pixel data of the output image signal based on the estimate equation using the coefficient data.

If an expansion rate of the post-conversion image is different, a different phase relation of the pixel of the output image signal is given with respect to the pixel of the input image signal. Therefore, in the method for storing the coefficient data for the estimate equation in the memory, to convert the expansion rate into various values, it is necessary to store items of coefficient data in accordance with these various values of the expansion rate in the memory. In such a case, therefore, it is necessary to provide a memory for storing a lot of items of coefficient data, thus leading to a problem of an expensive conversion device etc.

To solve this problem, the present applicant has earlier proposed a device that can produce coefficient data to be used in an estimate equation from coefficient seed data on the basis of phase information to eliminate a necessity of a memory for storing a lot of items of coefficient data to convert an expansion rate into various values (see Jpn. Pat. Appln. KOKAI Publication No. 2002-196737).

For example, by changing an expansion rate of an image consecutively, electronic zoom can be realized. This electronic zoom has had such problems that blur develops in an expanded still image as a whole, that transition from a still image to an expanded moving image encounters fold-back distortion, and that noise, if any, in an input image signal becomes conspicuous in an expanded image. Besides, if the expansion rate of the image changes rapidly in zooming, a processing range of the input image signal varies significantly over a period of time, thus causing a problem that no visually smooth zoom image can be obtained.

DISCLOSURE OF THE INVENTION

It is an object of the present invention to improve an image quality of a zoom image obtained by changing an expansion rate of an image consecutively.

Device for processing an image signal according to the invention produces a second image signal to display the image with expansion rate of the image being changed consecutively, based on a first image signal constituted of plural items of pixel data, the device comprising phase information generation means for generating phase information of a target position in the second image signal that corresponds to each of the expansion rates, pixel data production means for producing pixel data of the target position in the second image signal, in accordance with the phase information generated by the phase information generation means, and image quality adjustment means for adjusting a quality of the image due to the second image signal by using image quality adjustment information generated on the basis of information related to at least the expansion rate of the image.

A method for processing an image signal according to the invention is a method for processing an image signal that produces a second image signal to display the image with expansion rate of the image being changed consecutively, based on a first image signal constituted of plural items of pixel data, the method comprising the steps of generating phase information of a target position in the second image signal, the phase information corresponding to each of the expansion rates, producing pixel data of the target position in the second image signal, in accordance with the phase information generated by the phase information generation means, and adjusting a quality of the image due to the second image signal by using image quality adjustment information generated on the basis of information related to at least the expansion rate of the image.

A program related to the present invention is used to cause a computer to perform the above-described method for processing the image signal. A computer-readable medium related to the present invention stores this program.

In the present invention, phase information of the target position in the second image signal is generated corresponding to each expansion rate. Corresponding to this phase information, pixel data of the target position in the second image signal is produced. The production of this pixel data is performed using, for example, an estimate equation. That is, coefficient data to be used in the estimate equation that corresponds to the phase information is generated and, based on the first image signal, plural items of pixel data are selected that are located in a periphery of the target position in the second image signal, so that by using this coefficient data and the plural items of pixel data, the pixel data of the target position of the second image signal is calculated on the basis of the estimate equation.

In such a case where pixel data is produced using the estimate equation, using coefficient data obtained through learning processing by use of a teacher signal that corresponds to the second image signal and a student signal that corresponds to the first image signal allows pixel data of the target position in the second image signal to be obtained more accurately than through linear interpolation etc.

For example, the coefficient data is generated as follows. That is, coefficient seed data, which is coefficient data in a production equation, which contains phase information as a parameter, for producing coefficient data used in the estimate equation is stored in storage means. These coefficient seed data and phase information are used to produce coefficient data to be used in an estimate equation based on the production equation. In this case, no coefficient data that corresponds to each expansion rate is stored in a memory, thereby eliminating a necessity of the memory for storing a lot of coefficient data.

Further, for example, the coefficient data is generated as follows. That is, the coefficient data to be used in the estimate equation for each piece of phase information that can be generated by phase information generation means is stored in storage means. From this storage means, the coefficient data that corresponds to the phase information is read.

In this condition, based on the first image signal, plural items of pixel data of the target position in the second image signal are selected and, based on these plural items of pixel data, a class is detected to which pixel data of the target position in the second image signal belongs so that the coefficient data may be generated that corresponds not only to the phase information but also to this detected class, thereby enabling further improvement of an accuracy of the pixel data of the target position in the second image signal.

Further, a quality of an image due to the second image signal is adjusted by using image quality adjustment information generated on the basis of information related to at least an expansion rate of the image. It is to be noted that the image quality mentioned here may be, for example, a resolution or a noise suppression degree. The information related to an expansion rate of images may be, for example, a change rate in expansion rate, an expansion rate of images, etc.

Further, by using image quality adjustment information generated on the basis of characteristics information extracted from plural items of pixel data of the first image signal located in a periphery of the target position in the second image signal, an image quality of an image due to the pixel data of the target position in the second image signal is adjusted. It is to be noted that the characteristic information mentioned here may be, for example, movement information, a dynamic range, space waveform information, etc.

For example, a resolution and a noise suppression degree are adjusted to decrease as a change rate (zoom speed) in expansion rate of an image increases. It is thus possible to give a zoom image that appears smooth during zooming.

Further, for example, the noise suppression degree is adjusted to increase as the expansion rate (zoom expansion rate) of an image increases. It is thus possible to prevent noise in an expanded image from becoming conspicuous.

Further, for example, as the expansion rate (zoom expansion rate) of an image increases, the resolution is adjusted to increase for a still image and to decrease for a moving image. It is thus possible to suppress blur from developing in an expanded still image as a whole and fold-back distortion from occurring at transition from a still image to an expanded moving image.

The quality of an image in the second image signal may be adjusted when producing pixel data of the target position in the second image signal and further, after the pixel data is produced, an enhancer that enhances an upper frequency range, a noise cancellation circuit that cancels noise, etc. may be used.

When adjustment of the image quality is performed on generating pixel data, such the adjustment may be performed using coefficient data in accordance with image quality adjustment information. For example, to produce the coefficient data by using a production equation that contains phase information as a parameter, image quality adjustment information can be contained further in that production equation as a parameter, to obtain such coefficient data as to be in accordance with the phase information and the image quality adjustment information. Further, for example, in reading the coefficient data from the storage means, such coefficient data as to be in accordance with the phase information and the image quality adjustment information can be read from this storage means.

BRIEF DESCRIPTION OF THE DRAWINGS

FIGS. 8A, 8B, and 8C are diagrams each showing relationship between the change rate K and the image quality adjustment information f or g;

FIG. 11 is an explanatory diagram of an eight-step phase shift in a vertical direction;

BEST MODE FOR CARRYING OUT THE INVENTION

Figure 1:
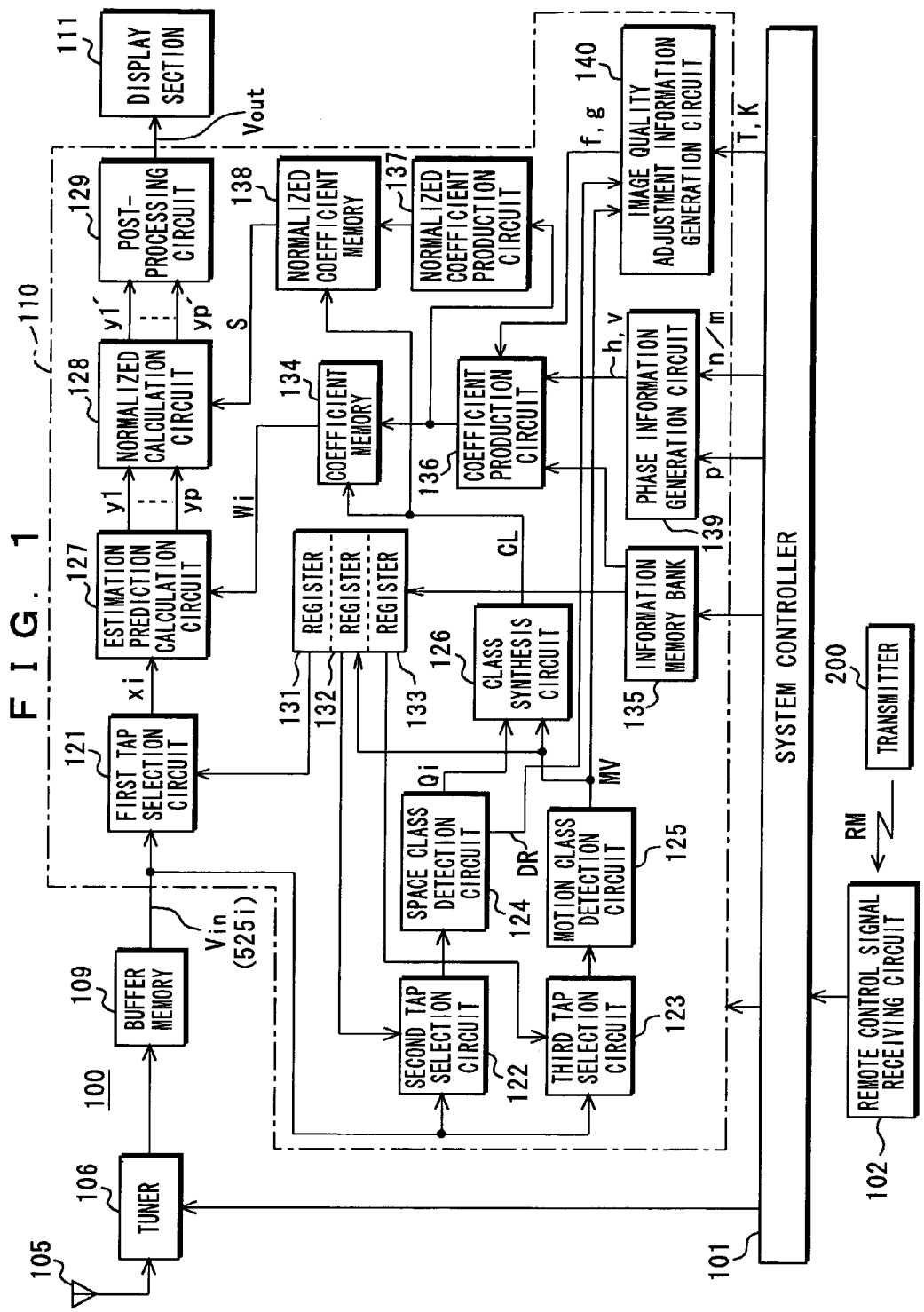
FIG. 1 is a block diagram of a configuration of an embodiment of a TV receiver.

The following will describe embodiments of the present invention with reference to drawings. FIG. 1 shows a configuration of a TV receiver 100 according to an embodiment. This TV receiver 100 produces an output image signal Vout based on a 525i signal (input image signal Vin)

obtained from a broadcast signal, to display an image due to this output image signal Vout.

The TV receiver 100 is equipped with a microcomputer and has a system controller 101 for controlling operations of an entire system and a remote control signal reception circuit 102 for receiving a remote control signal. In this configuration, the remote control signal reception circuit 102 is connected to the system controller 101, to receive a remote control signal RM output by a remote-controlled transmitter 200 in response to an operation of a user and supply the system controller 101 with an operation signal that corresponds to this signal RM.

The TV receiver 100 further has a reception antenna 105, a tuner 106 supplied with a broadcast signal (RF modulated signal) captured by this reception antenna 105 to perform channel selection, intermediate frequency amplification, detection processing, etc. on it so that a 525i signal may be obtained, and a buffer memory 109 for temporarily storing the 525i signal output from this tuner 106. It is to be noted that the 525i signal refers to an interlace-system image signal having 525 lines.

The TV receiver 100 further has an image-signal-processing section 110 for receiving, as the input image signal Vin, the 525i signal temporarily stored in the buffer memory 109 to produce a new 525i signal as the output image signal Vout based on this input image signal Vin and output it, and a display section 111 for displaying an image due to the output image signal Vout of this image-signal-processing section 110. The display section 111 is constituted of, for example, a cathode-ray tube (CRT) display, a flat display panel such as a liquid crystal display (CRT), etc.

The following will describe operations of the TV receiver 100 shown in FIG. 1.

A 525i signal output from the tuner 106 is supplied to the buffer memory 109 and stored in it temporarily. The 525i signal stored in this buffer memory 109 temporarily is input as an input image signal Vin to the image-signal-processing section 110.

In this image-signal-processing section 110, based on the input image signal Vin, a new 525i signal as an output image signal Vout is produced. In this case, it is possible to switch between an ordinary mode and a zoom mode in accordance with settings, which are made by a user's operation of the remote-controlled transmitter 200. In the ordinary mode, an entire range of the input image signal Vin is subject to processing, to produce the output image signal Vout that displays an image having an expansion rate of 1. In the zoom mode, the output image signal Vout is produced that displays such a zoom image that an expansion rate of the image changes consecutively around an arbitrary point (zoom center point P0) specified by the user as a center. In this zoom mode, the processing range RG of the input image signal Vin changes in accordance with the expansion rate of the image.

In the zoom mode, it is possible to switch further between a manual mode in which the image expansion rate is changed by a user's operation of operator and an automatic mode in which it is changed automatically. In the manual mode, when the user operates the operator, the image expansion rate changes at a change rate that is set beforehand. In the automatic mode, if an initial state of the expansion rate is 1, the image expansion rate is converted so as to become a target expansion rate setting value within a preset lapse of change time; if the initial state of the expansion rate is a target expansion rate, on the other hand, the image expansion rate is changed so as to become 1 within a preset lapse of change time. It is to be noted that the change rate in the manual mode and the change time and the target expansion rate in the automatic mode can be set by a user's operation of the remote-controlled transmitter 200.

The output image signal Vout output from this image-signal-processing section 110 is supplied to the display section 111, so that an image due to this output image signal Vout is displayed on a screen of this display section 111. The display section 111 displays an ordinary image having an expansion rate of 1 in the ordinary mode and displays, in the zoom mode, such a zoom image that an expansion rate of an image changes consecutively around an arbitrary point as a center.

Next, the image-signal-processing section 110 will be described in detail. This image-signal-processing section 110 has first through third tap selection circuits 121-123 each of which selectively takes out from a 525i signal stored in the buffer memory 109, for each unit pixel block constituting an output image signal Vout, plural items of pixel data located in a periphery of a position that corresponds to each pixel (target pixel) present in that unit pixel block, that is, a target position in the output image signal Vout and outputs it.

The first tap selection circuit 121 is used to selectively take out data of pixel (referred to as "prediction tap") to be used in prediction. The second tap selection circuit 122 is used to selectively take out data of pixel (referred to as "space class tap") to be used in categorization of space classes. The third tap selection circuit 123 is used to selectively take out data of pixel (referred to as "motion class tap") to be used in categorization of motion classes. It is to be noted that if a space class is determined by using pixel data that belongs to a plurality of fields, this space class also contains movement information.

The image-signal-processing section 110 further has a space class detection circuit 124 for detecting a space class based on a level distribution pattern of (plural items of) data of a space class tap which is selectively taken out by the second tap selection circuit 122 and outputting its class information.

The space class detection circuit 124 performs such calculations as to compress, for example, eight-bit data of a space class tap into two-bit data. This space class detection circuit 124 employs, for example, adaptive dynamic range coding (ADRC). According to ADRC, assuming that a maximum value of data of a space class tap is MAX, its minimum value is MIN, a dynamic range of data of the space class tap is DR (MAX−MIN+1), and the number of re-quantization bits is P, a re-quantization code Qi is obtained by calculations of Equation (1) on data ki of the space class tap. It is to be noted that [ ] in Equation (1) means that contents between them are subject to discarding of fraction. If Na number of items of data are given as data of a space class tap, i=1 to Na.

$$Qi=[(ki-\text{MIN}+0.5)\times 2^P/DR] \quad (1)$$

The image-signal-processing section 110 further has a motion class detection circuit 125 for detecting a motion class that mainly indicates a degree of movement from (plural items of) data of a motion class tap selectively output by the third tap selection circuit 123 and outputting its class information.

This motion class detection circuit 125 detects a motion class by using the following method for example. An inter-frame difference is calculated from data of the motion class tap taken out selectively by the third tap selection circuit 123, so that an average value of absolute values of these differences is subjected to threshold processing, to detect a motion class, which is an index of movement. That is, the motion class detection circuit 125 calculates an average value AV of absolute values of differences by using Equation (2). If the third tap selection circuit 123 takes out, for example, six items of pixel data, m1 to m6, and six items of data, n1 to n6, of the immediately preceding frame as data of a class tap, Nb in Equation (2) is 6.

$$AV = \frac{\sum_{i=1}^{Nb} |mi - ni|}{Nb} \quad (2)$$

Then, the motion class detection circuit 125 compares this calculated average value AV to one or a plurality of threshold values, to obtain class information MV of the motion class. For example, three threshold values th1, th2, and th3 (th1<th2 <th3) are prepared to detect four motion classes, if AV≦th1, MV=0, if th1<AV≦th2, MV=1, if th2<AV≦th3, MV=2, and if th3<AV, MV=3.

The image-signal-processing section 110 further has a class synthesis circuit 126 for obtaining, for each unit pixel block that constitutes an output image signal Vout to be created, a class code CL indicating a class to which each pixel (target pixel) present in that unit pixel block belongs, based on a re-quantization code Qi as class information of a space class output from the space class detection circuit 124 and class information MV of a motion class output from the motion class detection circuit 125.

This class synthesis circuit 126 calculates a class code CL by using Equation (3). It is to be noted that in Equation (3), Na indicates the number of items of data of a space class tap and P, the number of re-quantization bits in ADRC.

$$CL = \sum_{i=1}^{Na} Qi(2^P)^{i-1} + MVx(2^P)^{Na} \quad (3)$$

The image-signal-processing section 110 further has registers 131 to 133 and a coefficient memory 134. The register 131 is used to store tap position information of a prediction tap selected by the first tap selection circuit 121. The first tap selection circuit 121 selects a prediction tap according to the tap position information supplied from the register 131. The tap position information numbers, for example, a plurality of pixels that may possibly be selected, to specify the number of the pixel to be selected. This holds true also with the following tap position information.

The register 132 is used to store tap position information of a space class tap selected by the second tap selection circuit 122. The second tap selection circuit 122 selects a space class tap according to the tap position information supplied from the register 132.

It is to be noted that the register 132 stores tap position information A in a case where movement is relatively small and tap position information B in a case where movement is relatively large. Which one of these pieces of tap position information A and B is to be supplied to the second tap selection circuit 122 is decided by class information MV of a motion class output from the motion class detection circuit 125.

That is, if MV=0 or MV=1 because the movement is not present or small respectively, the tap position information A is supplied to the second tap selection circuit 122. With this, a space class tap which is selected by this second tap selection circuit 122 is supposed to cover a plurality of fields. If MV=2 or MV=3 because the movement is relatively large, on the other hand, the tap position information B is supplied to the second tap selection circuit 122. With this, a space class tap which is selected by this second tap selection circuit 122 is supposed to be only a pixel within the same field as that of a pixel to be created, which is not shown though.

It may be arranged such that the tap position information in the case where the movement is relatively small and that in the case where it is relatively large are stored also in the above-described register 131 so that the tap position information supplied to the first tap selection circuit 121 may be selected on the basis of the class information MV of a motion class output from the motion class detection circuit 125.

The register 133 is used to store tap position information of a motion class tap selected by the third tap selection circuit 123. The third tap selection circuit 123 selects a motion class tap according to the tap position information supplied from the register 133.

Further, the coefficient memory 134 is used to store coefficient data for an estimate equation, which is used by a later-described estimation prediction calculation circuit 127, for each class. This coefficient data is information used to convert a 525i signal into a new 525i signal as the output image signal Vout. The coefficient memory 134 is supplied with a class code CL output from the class synthesis circuit 126 as read address information, from which coefficient memory 134 coefficient data that corresponds to the class code CL is read and supplied to the estimation prediction calculation circuit 127.

The image-signal-processing section 110 further has an information memory bank 135. In this information memory bank 135, tap position information to be stored in the registers 131 to 133 is accumulated beforehand. In this case, in the information memory bank 135, tap position information that corresponds to an expansion rate or a change rate of an image is accumulated beforehand. Under the control of the system controller 101, the tap position information that corresponds to the image expansion rate or change rate is loaded from the information memory bank 135 to the registers 131-133.

As described above, the ordinary mode and the zoom mode are switched from each other when the user operates the remote-controlled transmitter 200. In the ordinary mode, the expansion rate of the image is 1. In the zoom mode, on the other hand, the image expansion rate changes in accordance with the user's operation of the operator (in the manual mode) or changes automatically (in the automatic mode).

Further, in the information memory bank 135, coefficient seed data of each class is accumulated beforehand. This coefficient seed data is coefficient data for a production equation that has phase information h and v and image quality adjustment information f and g as parameters required to produce coefficient data to be stored in the above-described coefficient memory 134.

The later-described estimation prediction calculation circuit 127 calculates pixel data y to be created, by using an estimate equation of Equation (4) from data xi of a prediction tap and coefficient data Wi read from the coefficient memory 134. If the number of prediction taps to be selected by the first tap selection circuit 121 is 10, n in Equation (4) is 10.

$$y = \sum_{i=1}^{n} Wi \cdot xi \quad (4)$$

Coefficient data Wi (i=1 to n) in this estimate equation is, as indicated by, for example, Equation (5), produced by using a production equation that has the phase information h and v and the image quality adjustment information f and g as parameters. It is to be noted that the phase information h indicates horizontal phase information and the phase information v indicates vertical phase information. Further, the image quality adjustment information f is used to adjust a resolution and the image quality adjustment information g is used to adjust a noise suppression degree.

In the information memory bank 135, pieces of coefficient seed data $w_{i0}$ through $w_{i30}$ (i=1 to n), which are coefficient data for this production equation, are stored for each class. A method for producing this coefficient seed data will be described later.

$$W_i = w_{i0} + w_{i1}f + w_{i2}g + w_{i3}f^2 + w_{i4}fg + w_{i5}g^2 + w_{i6}f^3 + \quad (5)$$
$$w_{i7}f^2g + w_{i8}fg^2 + w_{i9}g^3 + w_{i10}v + w_{i11}vf + w_{i12}vg +$$
$$w_{i13}vf^2 + w_{i14}vfg + w_{i15}vg^2 + w_{i16}h + w_{i17}hf + w_{i18}hg +$$
$$w_{i19}hf^2 + w_{i20}hfg + w_{i21}hg^2 + w_{i22}v^2 + w_{i23}v^2f + w_{i24}v^2g +$$
$$w_{i25}vh + w_{i26}vhf + w_{i27}vhg + w_{i28}h^2 + w_{i29}h^2f + w_{i30}h^2g$$

The image-signal-processing section 110 further has a coefficient production circuit 136 for using coefficient seed data and values of the phase information h and v and the image quality adjustment information f and g for each class, to produce coefficient data Wi (i=1 to n) for an estimate equation that corresponds to the values of the phase information h and v and the image quality adjustment information f and g for each class by using Equation (5).

To the coefficient production circuit 136, the coefficient seed data of each class is loaded. Further, for each unit pixel block that constitutes an output image signal Vout to be created, this coefficient production circuit 136 is supplied with the phase information h and v, that are generated by a phase information generation circuit 139, which will be described later, of each pixel present in that unit pixel block. This coefficient production circuit 136 is further supplied with the image quality adjustment information f and g generated by an image quality adjustment information generation circuit 140, which will be described later, for each unit pixel block.

Coefficient data Wi (i=1 to n) that corresponds to each combination of the phase information h and v and the image quality adjustment information f and g for each class produced by this coefficient production circuit 136 for each unit pixel block is stored in the above-described coefficient memory 134.

The image-signal-processing section 110 further has the phase information generation circuit 139. This phase information generation circuit 139 is supplied, from the system controller 101, with the correspondence information n/m of the number of pixels in respective vertical and horizontal fields in an input image signal Vin and an output image signal Vout corresponding to an expansion rate of an image. It is supplied also with information p of the zoom center point P0 in the zoom mode.

Based on these correspondence information n/m and information p of the zoom center point P0, for each unit pixel block that constitutes the output image signal Vout, the phase information generation circuit 139 generates phase information h and v of each pixel in that unit block. This phase information generation circuit 139 is constituted of, for example, an ROM table.

The phase information h and v of each pixel generated by this phase information generation circuit 139 for each unit pixel block that constitutes the output image signal Vout is each correlated with a pixel number (tap number) and supplied to the coefficient production circuit 136. It is to be noted that the phase information generation circuit 139 generates the phase information h and v corresponding to odd-numbered and even-numbered fields of the input image signal Vin, respectively.

The following will describe unit pixel block that constitutes the output image signal Vout.

The processing range RG of the input image signal Vin required to produce the output image signal Vout changes in accordance with an expansion rate (image size) of an image. Supposing that a size of an entire range of the input image signal Vin is 1, a size of the processing range RG of the input image signal Vin is 1 if the expansion rate of the image is, for example, 1 and, if the image expansion rate is 2, the size of the processing range RG of the input image signal Vin is ½. Generally, supposing that the image expansion rate is T, the size of the processing range RG of the input image signal Vin is 1/T.

Figure 2:
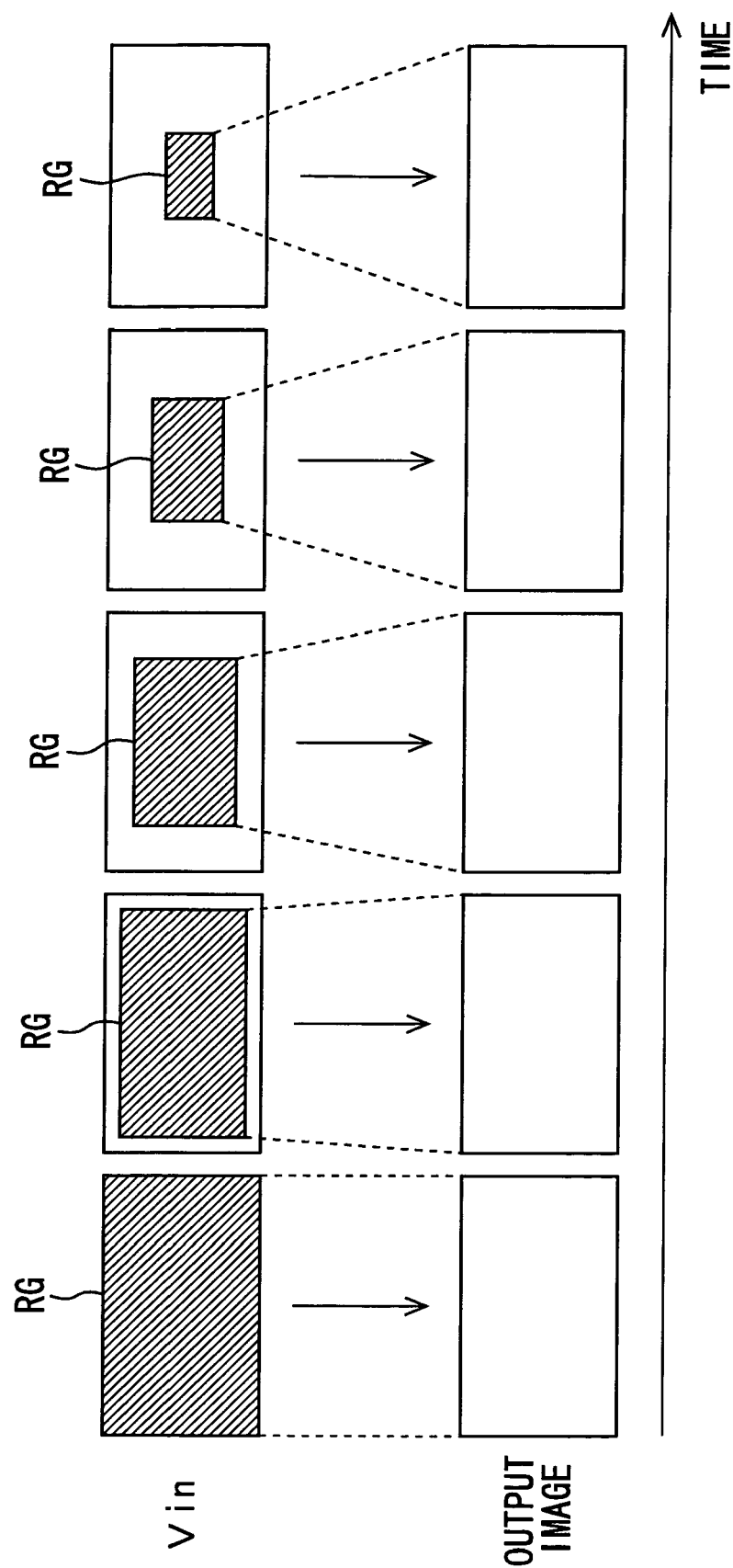
FIG. 2 is a diagram for showing a relationship between a processing range RG of an input image signal Vin and an output image.

In the ordinary mode, since the image expansion rate is 1, the size of the processing range RG of the input image signal Vin is fixed to 1. In the zoom mode, since the image expansion rate changes consecutively, the size of the processing range RG of the input image signal Vin also changes consecutively. FIG. 2 shows a relationship between the processing range RG of the input image signal Vin and a display range of an image (output image) due to the output image signal Vout when the image expansion rate increases gradually in the zoom mode. In this case, the size of the processing range RG of the input image signal Vin decreases sequentially, whereas a size of the display range of the output image is always constant. It is to be noted that in the zoom mode, a relationship opposite to that of FIG. 2 is given when the image expansion rate decreases sequentially.

Further, in the zoom mode, such a zoom image is displayed that an expansion rate of the image changes consecutively around an arbitrary point (zoom center point P0) specified by the user as a center. In this case, the processing range RG of the input image signal Vin is varied in accordance with the zoom center point P0.

Specifically, as described above, an actual processing range RG changes in accordance with an expansion rate of an image with respect to an entire range of the input image signal Vin. This processing range RG always includes the above-described zoom center point P0 and horizontal and vertical internal ratios of this zoom center point P0 are set so as to be the same as those of the zoom center point P0 in the entire range of the input image signal Vin.

Figure 3:
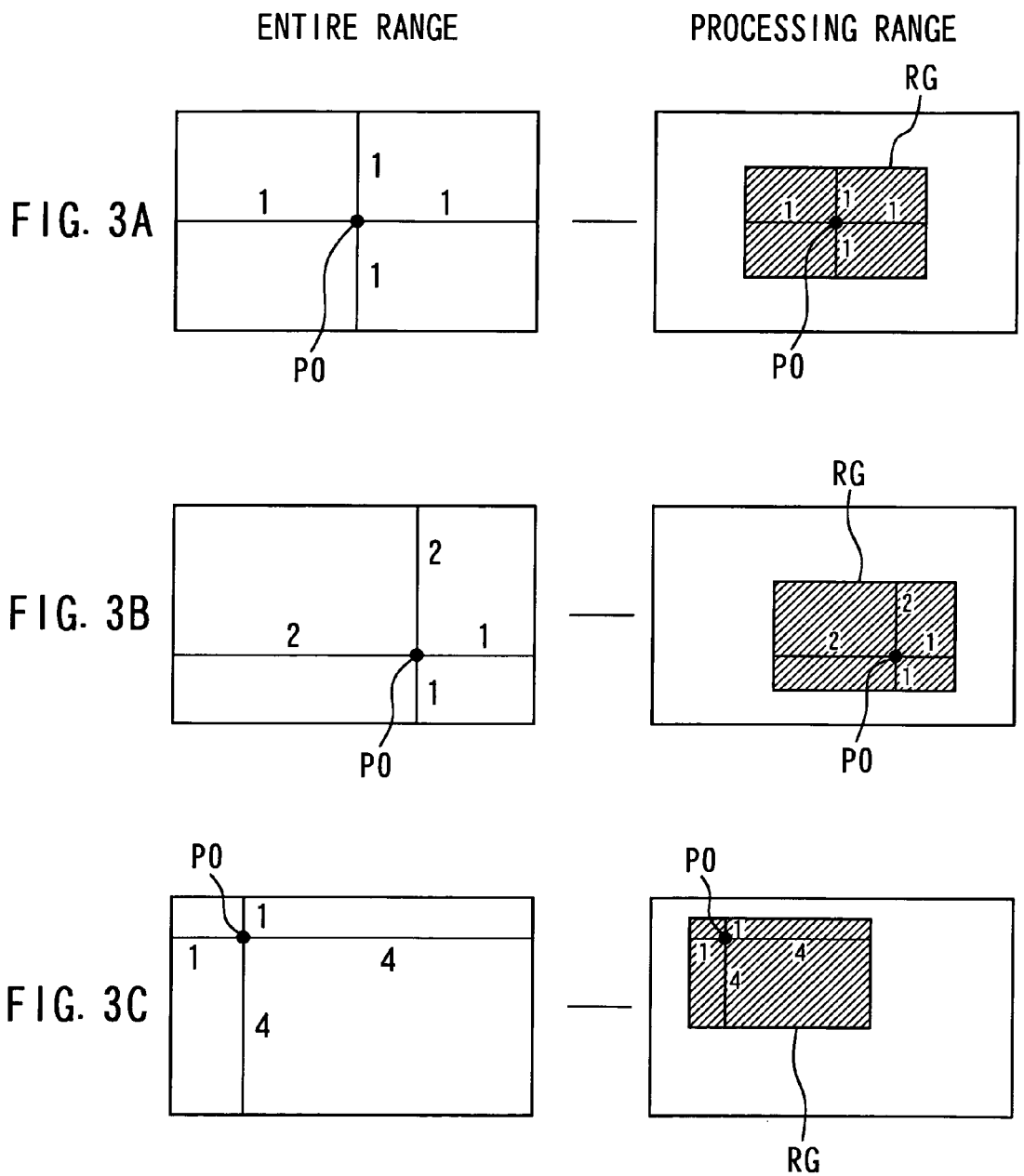
FIGS. 3A, 3B, and 3C are diagrams each showing relationship between a zoom center point P0 and the processing range RG.

FIGS. 3A to 3C show relationships between the zoom center point P0 and the processing range RG in a case where the image expansion rate is 2 (multiplied-by-2 zooming). Numbers in these FIGS. 3A to 3C indicate the internal ratio.

A plurality of each unit pixel block that constitutes the output image signal Vout is arranged orderly in a check pattern in the above-described processing range RG. A size of the unit pixel block changes with the expansion rate of the image and is as large as n×n when n×n number of pixels of the output image signal Vout correspond to m×m number of pixels of the input image signal Vin. This unit pixel block corresponds to the m×m number of pixels of the input image signal Vin.

Figure 4:
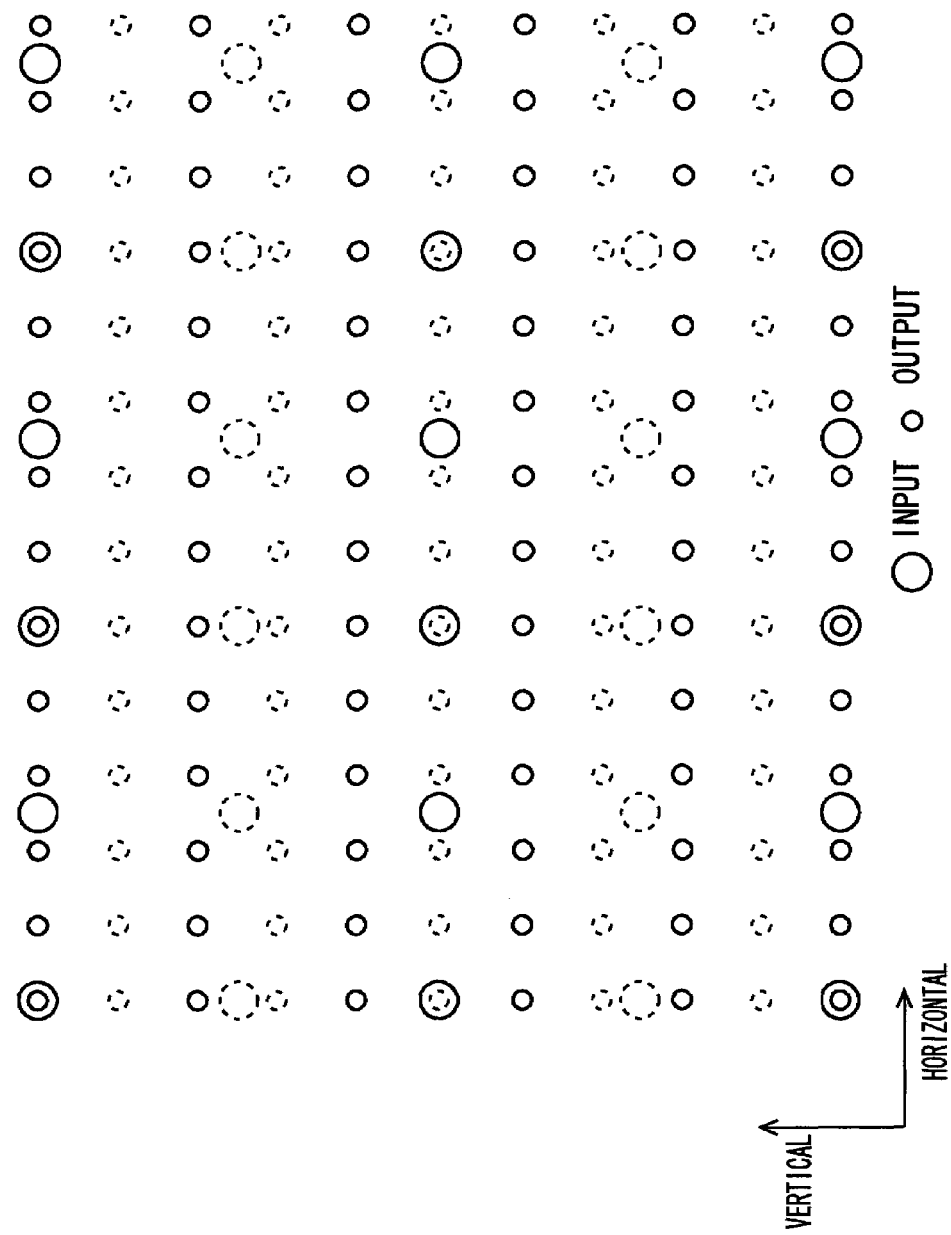
FIG. 4 is a diagram for showing a relationship between a pixel position of an input and that of an output at the time of multiplied-by-2.5 zooming.

If, for example, an expansion rate of 2.5 is selected, as shown in FIG. 4, n/m=5/2 vertically and horizontally. Therefore, 5×5 number of pixel blocks of a 525i signal as the output image signal Vout correspond to 2×2 number of pixel blocks of a 525i signal as the input image signal Vin. In this case, 5×5 number of pixels constitute each of the unit pixel blocks that constitute the output image signal Vout. It is to be noted that in FIG. 4, a large dot represents a pixel of the input image signal Vin and a small dot, that of the output pixel signal Vout. Further, a pixel position in an odd-numbered field is indicated by a solid line and that of an even-numbered field, by a broken line.

In this case, the phase information generation circuit 139 obtains, as phase information h, a distance from each pixel in these 5×5 number of unit pixel blocks to a pixel (nearest pixel) that is nearest horizontally and, as phase information v, its distance to a pixel (nearest pixel) that is nearest vertically among the 2×2 number of pixel blocks of the above-described 525i signal. In the present embodiment, the above phase information h and v is obtained assuming that horizontal and vertical inter-pixel distances of the 525i signal are 16.

It is to be noted that the phase information h is supposed to be a negative value if its target pixel is on the left of the nearest pixel and to be of a positive value if it is on the right of the nearest pixel. Similarly, the phase information v is supposed to be of a negative value if it is above the nearest pixel and to be of a positive value if it is below the nearest pixel.

Figure 5:
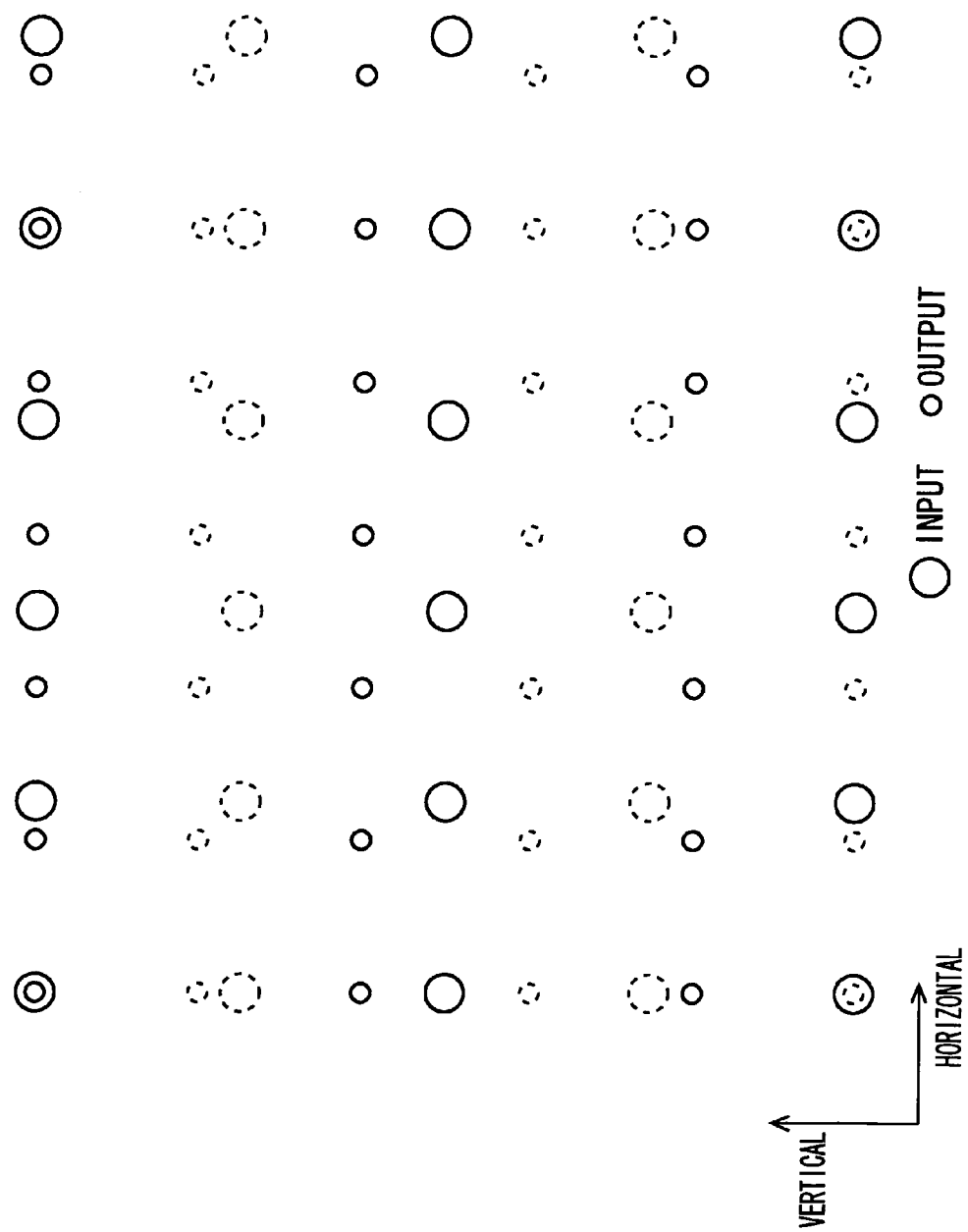
FIG. 5 is a diagram for showing a relationship between a pixel position of an input and that of an output at the time of multiplied-by-1.25 zooming.

Further, if an expansion rate of 1.25 is selected, as shown in FIG. 5, n/m=5/4 vertically and horizontally. Therefore, 5×5 number of pixel blocks of the 525i signal as the output image signal Vout correspond to 4×4 number of pixel blocks of the 525i signal as the input image signal Vin. In this case, 5×5 number of pixels constitute each of the unit pixel blocks that constitute the output image signal Vout. It is to be noted that in FIG. 5, a large dot represents a pixel of the input image signal Vin and a small dot, that of the output pixel signal Vout. Further, a pixel position in an odd-numbered field is indicated by a solid line and that of an even-numbered field, by a broken line.

In this case, the phase information generation circuit 139 obtains, as phase information h, a distance from each pixel in these 5×5 number of unit pixel blocks to a pixel (nearest pixel) that is nearest horizontally and, as phase information v, its distance to a pixel (nearest pixel) that is nearest vertically among the 4×4 number of pixel blocks of the above-described 525i signal.

It is to be noted that in the zoom mode, the phase information h and v is generated from the phase information generation circuit 139 so that phases of produced images pixels correspond to the zoom center point P0 may always be the same, for example, h and v may be equal to 0.

As shown in FIG. 1 again, the image-signal-processing section 110 further has the image quality adjustment information generation circuit 140 for generating image quality adjustment information f and g. This image quality adjustment information generation circuit 140 is supplied, from the system controller 101, with an expansion rate T and its change rate K as information related to the image expansion rate. It is further supplied with class information MV of a motion class from the motion class detection circuit 125 and with a dynamic range DR from the space class detection circuit 124. These class information MV and dynamic range DR are each characteristics information extracted from plural items of pixel data of the input image signal Vin located in a periphery of a target position in the output image signal Vout.

The image quality adjustment information generation circuit 140 generates image quality adjustment information f and g based on the expansion rate T, the change rate K, the class information MV, and the dynamic range DR. This image quality adjustment information generation circuit 140 is constituted of, for example, an ROM table. As described above, the image quality adjustment information f is used to adjust a resolution and the image quality adjustment information g is used to adjust a noise suppression degree. For example, the information f, g is each intended to take on a value of 0 to 8, so that f=0 and f=8 correspond to relatively low and high resolutions respectively and g=0 and g=8 correspond to noise not being suppressed and noise being suppressed relatively heavily respectively.

Figure 6A:
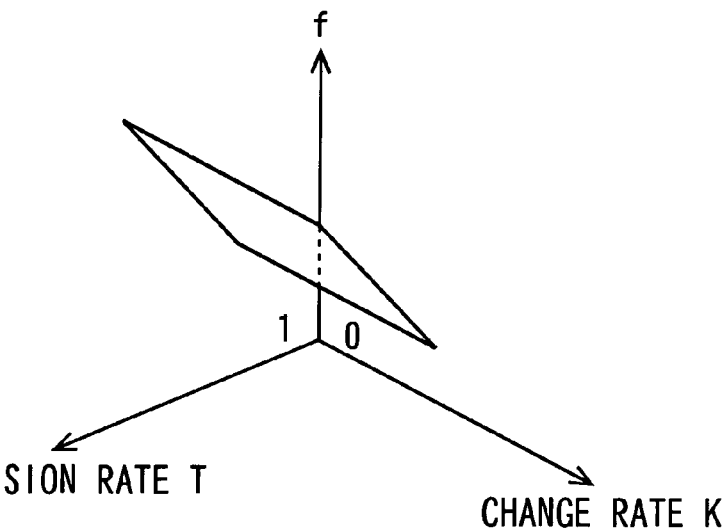
FIGS. 6A, 6B, and 6C are diagrams each showing relationship among an expansion rate T, a change rate K, and image quality adjustment information f or g.
Figure 6B:
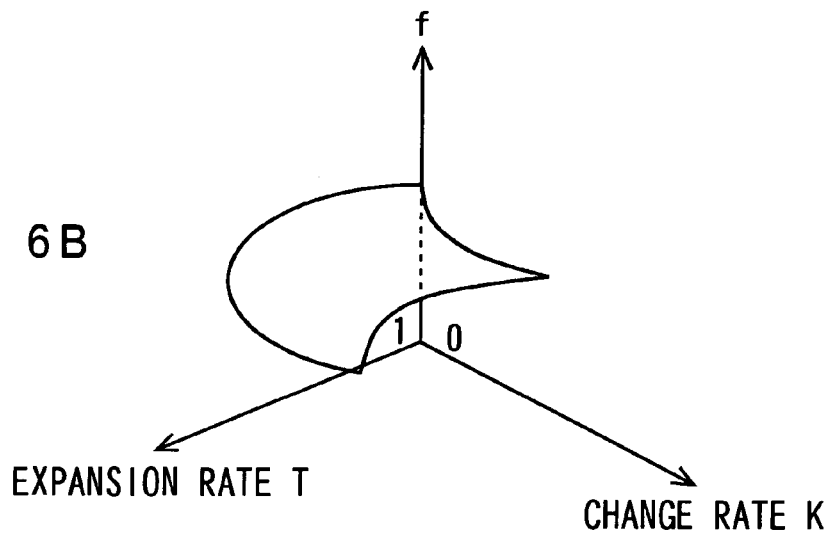
Figure 6C:
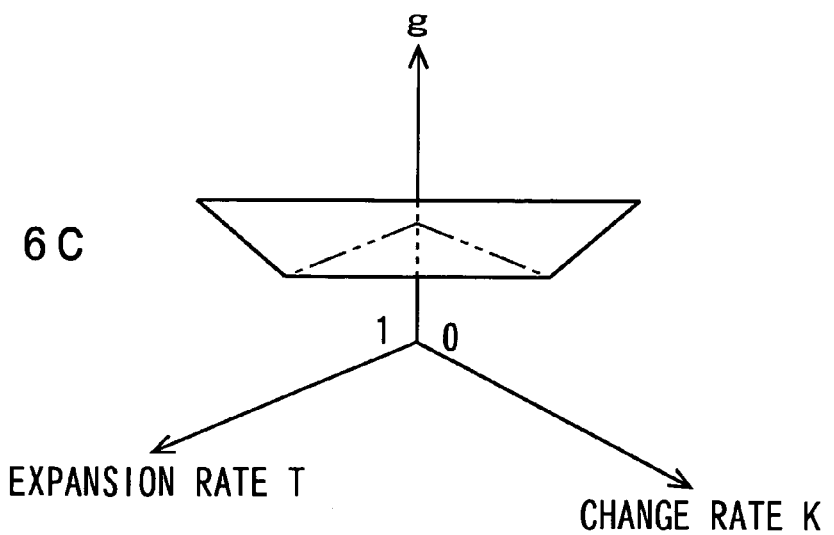

FIG. 6A shows a relationship among the expansion rate T, the change rate K, and the resolution adjustment information f in a case where MV=0 and a target position is a still image. FIG. 6B shows a relationship among the expansion rate T, the change rate K, and the resolution adjustment information f in a case where MV=1 to 3 and the target position is a moving image. FIG. 6C shows a relationship among the expansion rate T, the change rate K, and the resolution adjustment information g.

Figures 7A, 7B, 7C:
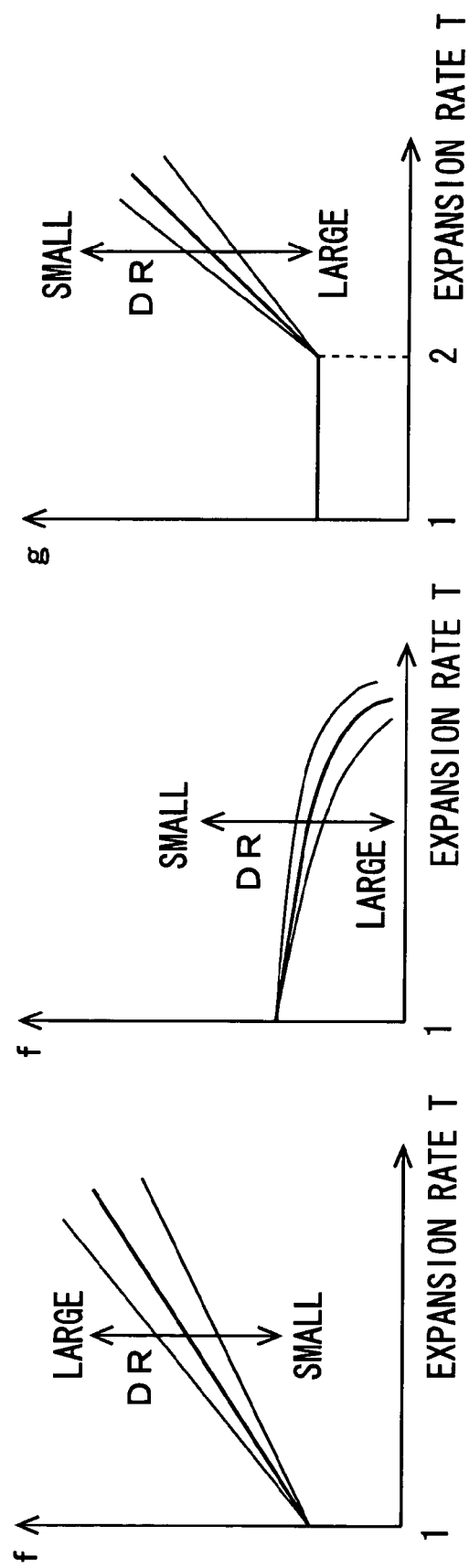
FIGS. 7A, 7B, and 7C are diagrams each showing relationship between the expansion rate T and the image quality adjustment information f or g.

FIGS. 7A to 7C show the relationships of the respective FIGS. 6A to 6C as viewed from the side of an axis of the expansion rate T. As shown in FIG. 7A, in the case of the still image, as the expansion rate T increases, a value of the resolution adjustment information f is set to increase, that is, in such a manner that the resolution may increase. It is thus possible to suppress blur in images that may occur when the still image is expanded.

Further, as shown in FIG. 7B, in the case of the moving image, as the expansion rate T increases, the value of the resolution adjustment information f is set to decrease, that is, in such a manner that the resolution may decrease. It is thus possible to prevent fold-back distortion in the expanded moving picture from becoming conspicuous at transition between motion classes.

Further, as shown in FIG. 7C, in a range where the expansion rate T exceeds a certain value, for example, two, as the expansion rate T increases, a value of the noise suppression degree is set to increase, that is, in such a manner that the noise may be suppressed more. It is thus possible to prevent noise in the expanded image from becoming conspicuous.

It is to be noted that as shown in FIG. 7A, the value of the resolution adjustment information f in a still image is set to increase, that is, in such a manner that the resolution may increase as the dynamic range DR becomes larger. It is done so in order to suppress blur at edges, which increases as the dynamic range RD becomes larger. Further, as shown in FIG. 7B, the value of the resolution adjustment information f in a moving image is set to decrease, that is, in such a manner that the resolution may decrease as the dynamic range DR becomes larger. It is done so in order to prevent edge movements from becoming more conspicuous as the dynamic range DR becomes larger. Further, as shown in FIG. 7C, the value of the noise suppression degree g is set to decrease, that is, in such a manner that the noise suppression degree may decrease as the dynamic range DR becomes larger. It is done so in order to prevent the resolution from decreasing due to suppression of noise, which is not conspicuous where the dynamic range DR is large.

FIGS. 8A-8C show the relationships of the respective FIGS. 6A-6C as viewed from the side of an axis of the change rate K. As shown in FIG. 8A, in the case of the still image, as the change rate K increases, the value of the resolution adjustment information f is set to decrease, that is, in such a manner that the resolution may decrease. It is thus possible to obtain a visually smooth zoom image because the resolution decreases even if time jitter of a processing range of the input image signal Vin increases due to an increase in change rate when the still image is expanded.

Further, as shown in FIG. 8B, in the case of the moving image also, as the change rate K increases, the value of the resolution adjustment information f is set to decreases, that is, in such a manner that the resolution may decrease. However, the moving image has larger image time jitter than the still image, so that as compared to the case of the still image, the resolution decreases at a larger percentage. It is thus possible to obtain a visually smooth zoom image because the resolution decreases even if time jitter of the processing range of the input image signal Vin increases due to an increase in change rate when the still image is expanded.

Further, as shown in FIG. 8C, in a range where the change rate K exceeds a certain value, as the change rate K increases, the value of the noise suppression information g increases, that is, is set so that noise may be suppressed more. It is thus possible to well suppress the noise when the change rate is increased.

It is to be noted that as shown in FIG. 8A, as the dynamic range DR becomes larger, the value of the resolution adjustment information f in a still image decreases, that is, is set so that the resolution may decrease. It is done so in order to prevent an edge from becoming more conspicuous as the dynamic range DR becomes larger when the still image becomes more like a moving image as the change rate K increases. Further, as shown in FIG. 8B, as the dynamic range DR becomes larger, the value of the resolution adjustment information f in the moving image decreases, that is, is set so that the resolution may decrease. The reason is the same as that in the above case of the still image. Further, as shown in FIG. 8C, as the dynamic range DR increases, the value of the noise suppression degree adjustment information g decreases, that is, is set so that the noise suppression degree may decrease. It is done so in order to prevent the resolution from decreasing due to suppression of noise, which is less conspicuous where the dynamic range DR is larger.

It may be arranged in such a manner that a plurality of relations such as shown in FIGS. 6A-6C are prepared so that the user can select any one of them to be employed actually, by operating the remote-controlled transmitter 200, for example.

As shown in FIG. 1 again, the image-signal-processing section 110 further has a normalized coefficient production circuit 137 and a normalized coefficient memory 138. As described above, for each unit pixel block that constitutes the output image signal Vout, the coefficient production circuit 136 produces coefficient data Wi (i=1 to n) of each pixel present in that unit pixel block for each class. The normalized coefficient production circuit 137 calculates a normalized coefficient S of each class by using Equation (6) for each of the unit pixel blocks. The normalized coefficient memory 138 stores this normalized coefficient S for each class.

This normalized coefficient memory 138 is supplied with a class code CL, as read address information, that is output from the above-described class synthesis circuit 126, from which normalized coefficient memory 138 a normalized coefficient S that corresponds to the class code CL is read and supplied to a normalized calculation circuit 128, which will be described later.

$$S = \sum_{i=1}^{n} Wi \tag{6}$$

The image-signal-processing section 110 further has the estimation prediction calculation circuit 127. This estimation prediction calculation circuit 127 calculates data of each pixel in unit pixel block that constitutes the output image signal Vout from data xi (i=1 to n) of a prediction tap selectively taken out by the first tap selection circuit 121 and coefficient data Wi (i=1 to n) read from the coefficient memory 134.

This estimation prediction calculation circuit 127 produces pixel data that constitutes the output image signal Vout for each of the unit pixel blocks. That is, this estimation prediction calculation circuit 127 is supplied with data xi of a prediction tap that corresponds to each pixel (target pixel) in a unit pixel block from the first tap selection circuit 121 and coefficient data Wi that corresponds to each pixel that constitutes that unit pixel block from the coefficient memory 134. Data of each pixel that constitutes the unit pixel block is calculated separately by the estimate equation of the above-described Equation (4).

For example, if the expansion rate of an image of 2.5 (n/m=5/2) as shown in FIG. 4, 25 items of pixel data are produced as pixel data of each of the pixels that constitute the unit pixel block. Further, although not shown, if the image expansion rate is 1.75 (n/m=7/4), 49 items of pixel data are produced as the pixel data of each of the pixels that constitute the unit pixel block.

The image-signal-processing section 110 further has the normalized calculation circuit 128. This normalized calculation circuit 128 normalizes items of data $y_1$ to $y_P$ (P: the number of pixels that constitute a unit block) of each pixel in unit pixel blocks that constitute the output image signal Vout sequentially output from the estimation prediction calculation circuit 127, by dividing them by a normalized coefficient S that corresponds to coefficient data Wi (i=1 to n) used in each production that is read from the normalized coefficient memory 138.

Although not described above, the coefficient production circuit 136 produces coefficient data for an estimate equation by using coefficient seed data, which produced coefficient data contains a rounding error, so that a total sum of the items of coefficient data Wi (i=1 to n) is not guaranteed to become 1.0. Therefore, the items of data $y_1$ to $y_P$ of each pixel calculated by the estimation prediction calculation circuit 127 fluctuate in level owing to the rounding error. As described above, such fluctuations can be removed by normalization by the normalized calculation circuit 128.

The image-signal-processing section 110 further has a post-processing circuit 129. This post-processing circuit 129 constitutes a 525i signal of items of data $y_1'$ to $y_P'$ of a pixel in each unit pixel block sequentially supplied from the normalized calculation circuit 128 after being normalized and outputs this 525i signal as an output image signal Vout. This post-processing circuit 129 outputs those items of pixel data $y_1'$ to $y_P'$ in each unit pixel block in one-field batches in raster scan order, thus providing the 525i signal.

Next, operations of the image-signal-processing section 110 will be described below.

From the 525i signal stored in the buffer memory 109 as the input image signal Vin, the second tap selection circuit 122 selectively takes out data (pixel data) of a space class tap located in a periphery of a target position in an output image signal Vout to be created. In this case, the second tap selection circuit 122 selects the tap based on tap position information that corresponds to a motion and an image expansion rate that are supplied from the register 132.

Data of the space class tap selectively taken out by this second tap selection circuit 122 is supplied to the space class detection circuit 124. This space class detection circuit 124 performs ADRC processing on each item of pixel data as the data of the space class, to obtain a re-quantization code Qi as class information of the space class (see Equation (1)).

Further, from the 525i signal stored in the buffer memory 109 as the input image signal Vin, the third tap selection circuit 123 selectively takes out data (pixel data) of a motion class tap located in a periphery of the target position in the output image signal Vout to be created. In this case, the third tap selection circuit 123 selects the tap based on tap position information that corresponds to an image expansion rate supplied from the register 133.

The data of the motion class tap selectively taken out by this third tap selection circuit 123 is supplied to the motion class detection circuit 125. This motion class detection circuit 125 obtains class information MV of a motion class from each pixel data as the data of the motion class tap.

This motion information MV and the above-described re-quantization code Qi are supplied to the class synthesis circuit 126. From these motion information MV and re-quantization code Qi, this class synthesis circuit 126 sequentially obtains a class code CL that indicates a class to which each pixel (target pixel) in the unit pixel blocks that constitute the output image signal Vout to be created (see Equation (3)) belongs. This class code CL is supplied as read address information to the coefficient memory 134 and the normalized coefficient memory 138.

In the coefficient memory 134, coefficient data Wi (i=1 to n) for an estimate equation of each class that corresponds to phase information h and v of each pixel in the unit pixel block that constitutes the output image signal Vout generated by the phase information generation circuit 139 is generated by the coefficient production circuit 136 and stored. In the normalized coefficient memory 138, on the other hand, a normalized coefficient S that corresponds to the coefficient data Wi (i=1 to n) of each class and each phase information produced by the coefficient production circuit 136 as described above is produced by the normalized coefficient production circuit 137 and stored.

When the coefficient memory 134 is supplied with the class code CL as read address information as described above, coefficient data Wi at each of the pieces of phase information h and v that correspond to the class code CL is read from this coefficient memory 134 and supplied to the estimation prediction calculation circuit 127.

Further, from the 525i signal as the input image signal Vin stored in the buffer memory 109, the first tap selection circuit 121 selectively takes out data (pixel data) of a prediction tap located in a periphery of a target position in the output image signal to be created. In this case, the first tap selection circuit 121 selects the tap based on tap position information that corresponds to the image expansion rate supplied from the register 131. Data xi of the prediction tap taken out selectively by this first tap selection circuit 121 is supplied to the estimation prediction calculation circuit 127.

From the data xi of the prediction tap and the coefficient data Wi at each of the pieces of phase information read from the coefficient memory 134, the estimation equation calculation circuit 127 simultaneously calculates items of data $y_1$ to $y_P$ of each pixel in the unit pixel block that constitutes the output image signal Vout to be created (see Equation (4)). The items of data $y_1$ to $y_P$ of each of the pixels in the unit pixel block that constitutes the output image signal Vout sequentially output from this estimation prediction calculation circuit 127 are supplied to the normalized calculation circuit 128.

As described above, the normalized coefficient memory 138 is supplied with the class code CL as read address information, from which normalized coefficient memory 138 a normalized coefficient S that corresponds to the class code CL, that is, a normalized coefficient S that corresponds to the coefficient data Wi used in calculation of each of the items of data $y_1$ to $y_P$ output from the estimation prediction calculation circuit 127 is read and supplied to the normalized calculation circuit 128. The normalized calculation circuit 128 normalizes the items of data $y_1$ to $y_P$ output from the estimation prediction calculation circuit 127 by dividing them by each of the corresponding normalized coefficients S. Accordingly, fluctuations are removed in level of the items of data $y_1$ to $y_P$ owing to the rounding errors generated when the coefficient data for the estimate equation (see Equation (4)) has been obtained with the production equation (see Equation (5)) by using the coefficient seed data.

In such a manner, the items of data $y_1'$ to $y_P'$ of each of the pixels in the unit pixel blocks normalized and sequentially output by the normalized calculation circuit 128 are supplied to the post-processing circuit 129. Such an operation is performed in each of fields of the output image signal Vout on a plurality of unit pixel blocks in that field. The post-processing circuit 129 prepares each field of the items of pixel data $y_1'$ to $y_P'$ and outputs those one-field batches in raster scan order. Thus, the 525i signal as the output image signal is obtained from the post-processing circuit 129.

It is to be noted that the processing range RG of the input image signal Vin used to produce the output image signal Vout is varied in accordance with the image expansion rate (image size). Further, this processing range RG includes the zoom center point P0 always and the horizontal and vertical internal ratios of this zoom center point P0 are set so as to be the same as those of the zoom center point P0 in the entire range of the input image signal Vin. Further, for each of the unit pixel blocks in this processing range RG, the phase information generation circuit 139 generates the phase information h and v of each of the pixels present in that unit pixel block.

Accordingly, since the image expansion rate is fixed to 1, an ordinary image having an expansion rate of 1 is displayed on the display section 111. Further, in the zoom mode, since the image expansion rate changes sequentially, such a zoom image that the image expansion rate changes consecutively is displayed around a user-specified zoom center point P0 as a center, on the display section 111.

As described above, the coefficient production circuit 136 uses the coefficient seed data of each class loaded from the information memory bank 135 and values of the pieces of phase information h and v generated by the phase information generation circuit 139, to generate coefficient data Wi for an estimate equation that corresponds to the values of the pieces of phase information h and v for each class, which coefficient data Wi is stored in the coefficient memory 134.

The coefficient data Wi at each of the pieces of phase information read from this coefficient memory 134 corresponding to the class code CL is used by the estimation prediction calculation circuit 127, to calculate items of data $y_1$ to $y_P$ of each of the pixels in the unit pixel block that constitutes the output image signal Vout. In such a manner, it is avoided to store the coefficient data that corresponds to each expansion rate, thus eliminating a necessity of providing a memory to store a lot of items of coefficient data.

Further, the pieces of image quality adjustment information f and g are generated by the image quality adjustment information generation circuit 140 corresponding to the image expansion rate T, its change rate K, the motion class information MV, and the dynamic range DR and supplied to the coefficient production circuit 136. This coefficient production circuit 136 in turn produces coefficient data Wi corresponding to these pieces of image quality adjustment information f and g, to adjust the image quality. It is thus possible to improve the image quality of the zoom image.

For example, as the change rate of the expansion rate of an image increases, the resolution and the noise suppression degree are adjusted to decrease, thereby enabling obtaining a smooth zoom image when the image is expanded. Further, for example, as the expansion rate of an image increases, the noise suppression degree is adjusted to increase, thus preventing noise from becoming conspicuous in an expanded image. Further, for example, the expansion rate of an image increases, the resolution is adjusted to increase in a still image and to decrease in a moving image, thereby preventing blur from developing all over the image when the still image is expanded and preventing fold-back distortion from occurring at transition of the motion class when the moving image is expanded.

It is to be noted that image quality adjustment by use of the pieces of image quality adjustment information f and g need not always be performed when producing the coefficient data Wi. It may be performed using an enhancer that enhances an upper frequency range, a noise cancellation circuit that cancels noise, etc. after the pixel data of the output image signal Vout is produced by the estimation prediction calculation circuit 127.

As described above, the coefficient seed data is stored in the information memory bank 135 for each class. This coefficient seed data has been produced through learning beforehand.

First, one example of this production method will be described as follows. An example is given for obtaining items of coefficient seed data $w_{10}$ through $w_{i30}$, which are coefficient data in a production equation of Equation (5).

For the following description, $t_j$ (j=0 to 30) is defined as in Equation (7).

$t_0=1, t_1=f, t_2=g, t_3=f^2, t_4=fg, t_5=g^2, t_6=f^3,$ $t_7=f^2 g, t_8=fg^2, t_9=g^3, t_{10}=v, t_{11}=vf, t_{12}=vg,$ $t_{13}=vf^2, t_{14}=vfg, t_{15}=vg^2, t_{16}=h, t_{17}=hf,$ $t_{18}=hg, t_{19}=hf^2, t_{20}=hfg, t_{21}=hg^2, t_{21}=hg^2, t_{22}=v^2,$ $t_{23}=v^2f, t_{24}=v^2g, t_{25}=vh, t_{26}=vhf, t_{27}=vhg,$ $t_{28}=h^2, t_{29}=h^2f, t_{30}=h^2g$ (7)

By using this Equation (7), Equation (5) is rewritten into the following Equation (8).

$$Wi = \sum_{j=0}^{30} w_{ij} \times t_j \quad (8)$$

Finally, an undetermined coefficient $w_{ij}$ is obtained through learning. That is, by using pixel data of a student signal and pixel data of a teacher signal for each class, such a coefficient value as to minimize a squared error is determined. This is a solution by means of so-called the least squares method. Assuming that the number of learning pieces to be m, a residual in the k'th ($1 \leq k \leq m$) items of learning data to be $e_k$, and a total sum of the squared errors to be E, E is given by Equation (9) by using Equations (4) and (5). In it, $x_{ik}$ indicates the k'th items of pixel data at the i'th prediction tap position in the student image and $Y_k$ indicates the corresponding k'th items of pixel data in the teacher image.

$$E = \sum_{k=1}^{m} e_k^2 \quad (9)$$

$$= \sum_{k=1}^{m} [yk - (W_1 x_{1k} + W_2 x_{2k} + \ldots + W_n x_{nk})]^2$$

$$= \sum_{k=1}^{m} \{yk - [(t_0 w_{10} + t_1 w_{11} + \ldots + t_{30} w_{130})x_{1k} + \ldots + (t_0 w_{n0} + t_1 w_{n1} + \ldots + t_{30} w_{n30})x_{nk}]^2\}$$

By the solution by means of the least squares method, such $w_{ij}$ is determined that a partial differentiation with respect to $w_{ij}$ in Equation (9) may be 0. It is expressed by the following Equation (10).

$$\frac{\partial E}{\partial w_{ij}} = \sum_{k=1}^{m} 2\left(\frac{\partial e_k}{\partial w_{ij}}\right) e_k = -\sum_{k=1}^{m} 2 tj \, x_{ik} e_k = 0 \quad (10)$$

Subsequently, by defining $X_{ipjq}$ and $Y_{ip}$ as in Equations (11) and (12) respectively, Equation (10) is rewritten into Equation (13) using matrix.

$$X_{ipjq} = \sum_{k=1}^{m} x_{ik} t_p x_{jk} t_q \quad (11)$$

$$Yip = \sum_{k=1}^{m} x_{ik} t_p y_k \quad (12)$$

$$\begin{bmatrix} X_{1010} & X_{1011} & X_{1012} & \cdots & X_{10130} & X_{1020} & \cdots & X_{10n30} \\ X_{1110} & X_{1111} & X_{1112} & \cdots & X_{11130} & X_{1120} & \cdots & X_{11n30} \\ X_{1210} & X_{1211} & X_{1212} & \cdots & X_{12130} & X_{1220} & \cdots & X_{12n30} \\ \vdots & \vdots & \vdots & \ddots & \vdots & \vdots & \ddots & \vdots \\ X_{13010} & X_{1301} & X_{13012} & \cdots & X_{130130} & X_{13020} & \cdots & X_{130n30} \\ X_{2010} & X_{2011} & X_{2012} & \cdots & X_{20130} & X_{2020} & \cdots & X_{20n30} \\ \vdots & \vdots & \vdots & \ddots & \vdots & \vdots & \ddots & \vdots \\ X_{n3010} & X_{n3011} & X_{n3012} & \cdots & X_{n30130} & X_{n3020} & \cdots & X_{n30n30} \end{bmatrix} \quad (13)$$

$$\begin{bmatrix} w_{10} \\ w_{11} \\ w_{12} \\ \vdots \\ w_{130} \\ w_{20} \\ \vdots \\ w_{n30} \end{bmatrix} = \begin{bmatrix} Y_{10} \\ Y_{11} \\ Y_{12} \\ \vdots \\ Y_{130} \\ Y_{20} \\ \vdots \\ Y_{n30} \end{bmatrix}$$

This equation is generally referred to as a normalized equation. This normalized equation is solved by using a sweeping-put method (Gauss-Jordan elimination) etc. with respect to $w_{ij}$, to calculate coefficient seed data.

Figure 9:
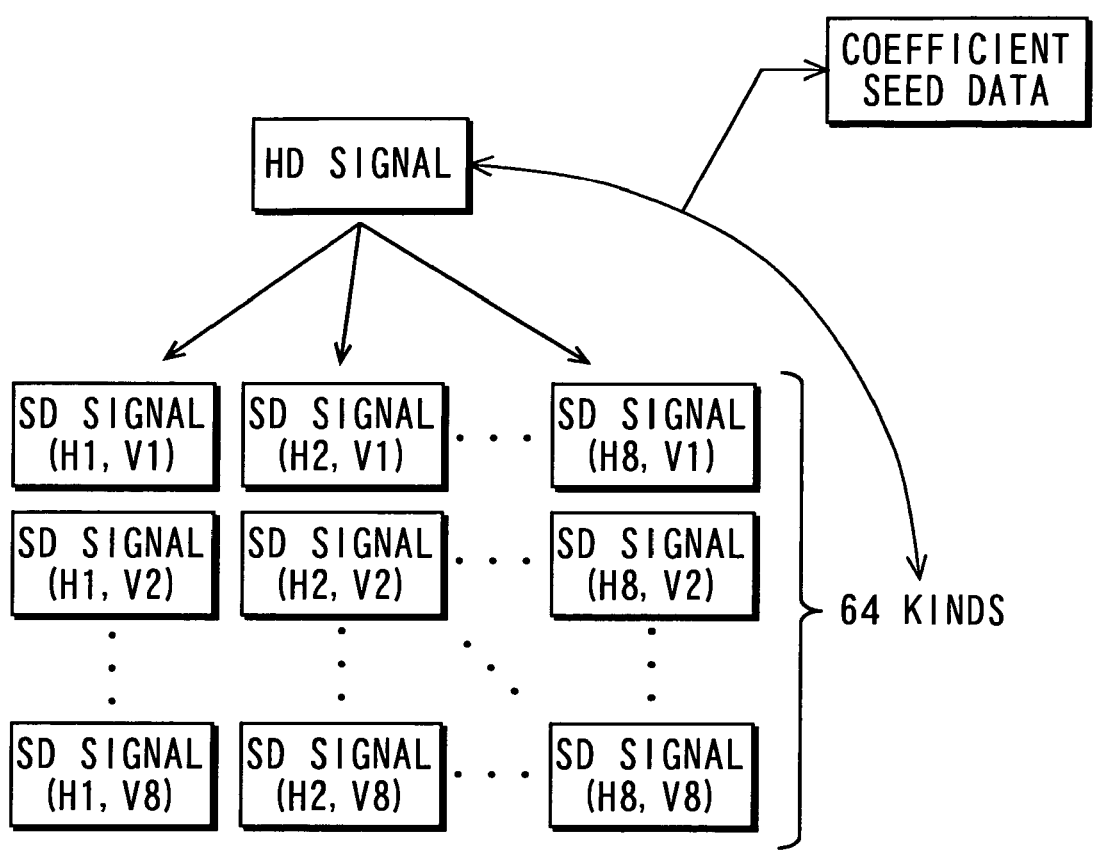
FIG. 9 is a diagram for showing one example of a coefficient seed data production method.

FIG. 9 shows a concept of the above-described method for producing coefficient seed data. According to this method, an SD signal (525i signal) as a student signal is produced from an HD signal (1050i signal) as a teacher signal. The 1050i signal refers to an interlace-system image signal that has 1050 lines.

Figure 10:
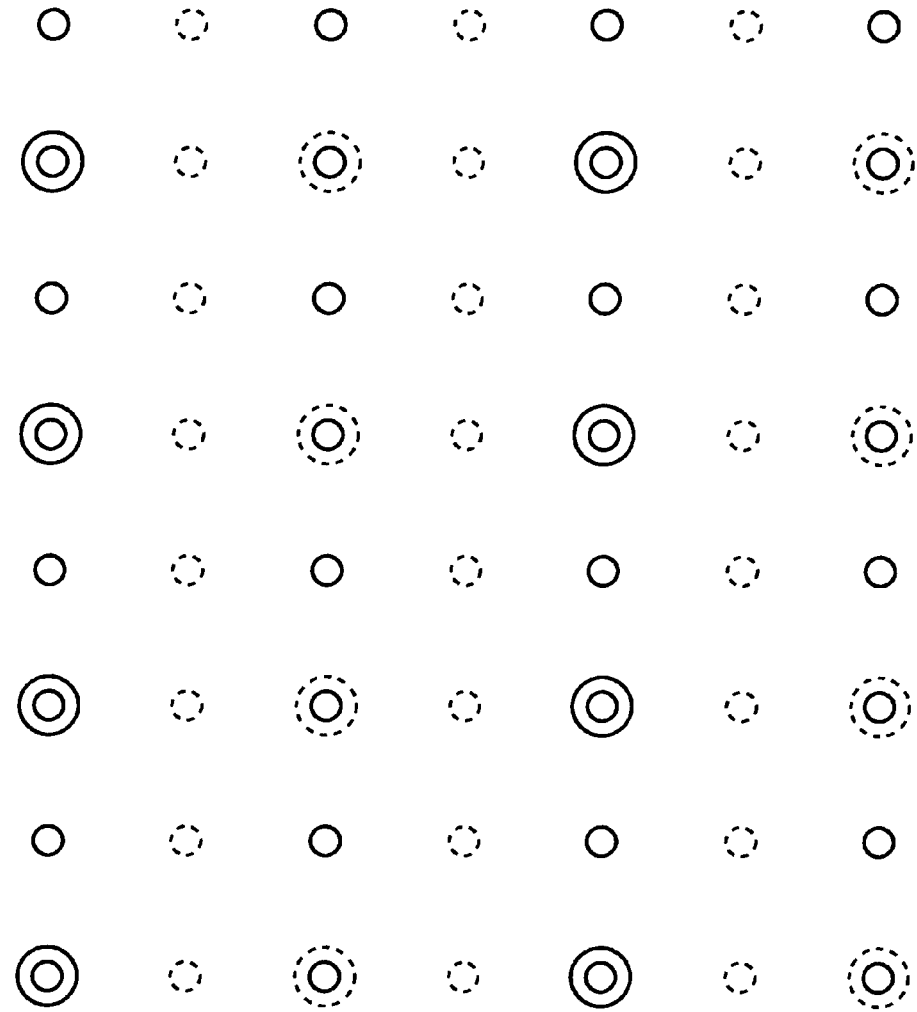
FIG. 10 is a diagram for showing a relationship between a pixel position of a 525i signal (SD signal) and that of a 1050i signal (HD signal)

FIG. 10 shows a relationship between a pixel position of the 525i signal and that of the 1050i signal. In it, a large dot indicates a pixel of the 525i signal and a small dot, a pixel of the 1050i signal. Further, a pixel position of an odd-numbered field is indicated by a solid line and that of an even-numbered field, by a broken line.

By shifting a phase of this SD signal in eight steps vertically and another eight steps horizontally, 8×8=64 kinds of SD signals $SD_1$ through $SD_{64}$ are produced. FIG. 11 shows eight-step vertical phase shift states V1-V8. In it, a vertical inter-pixel spacing of the SD signal is supposed to be 16 and a downward direction, to be positive. Further, "o" indicates an odd-numbered field and "e", an even-numbered field.

State V1 assumes that the SD signal has a shift of 0, in which case a pixel of the HD signal has phases of 4, 0, −4, and −8 with respect to a pixel of the SD signal. State V2 assumes that the SD signal has a shift of 1, in which case the pixel of the HD signal has phases of 7, 3, −1, and −5 with respect to the pixel of the SD signal. State V3 assumes that the SD signal has a shift of 2, in which case the pixel of the HD signal has phases of 6, 2, −2, and −6 with respect to the pixel of the SD signal. State V4 assumes that the SD signal has a shift of 3, in which case the pixel of the HD signal has phases of 5, 1, −3, and −7 with respect to the pixel of the SD signal.

State V5 assumes that the SD signal has a shift of 4, in which case the pixel of the HD signal has phases of 4, 0, −4, and −8 with respect to the pixel of the SD signal. State V6 assumes that the SD signal has a shift of 5, in which case the pixel of the HD signal has phases of 7, 3, −1, and −5 with respect to the pixel of the SD signal. State V7 assumes that the SD signal has a shift of 6, in which case the pixel of the HD signal has phases of 6, 2, −2, and −6 with respect to the pixel of the SD signal. State V8 assumes that the SD signal has a shift of 7, in which case the pixel of the HD signal has phases of 5, 1, −3, and −7 with respect to the pixel of the SD signal.

Figure 12:
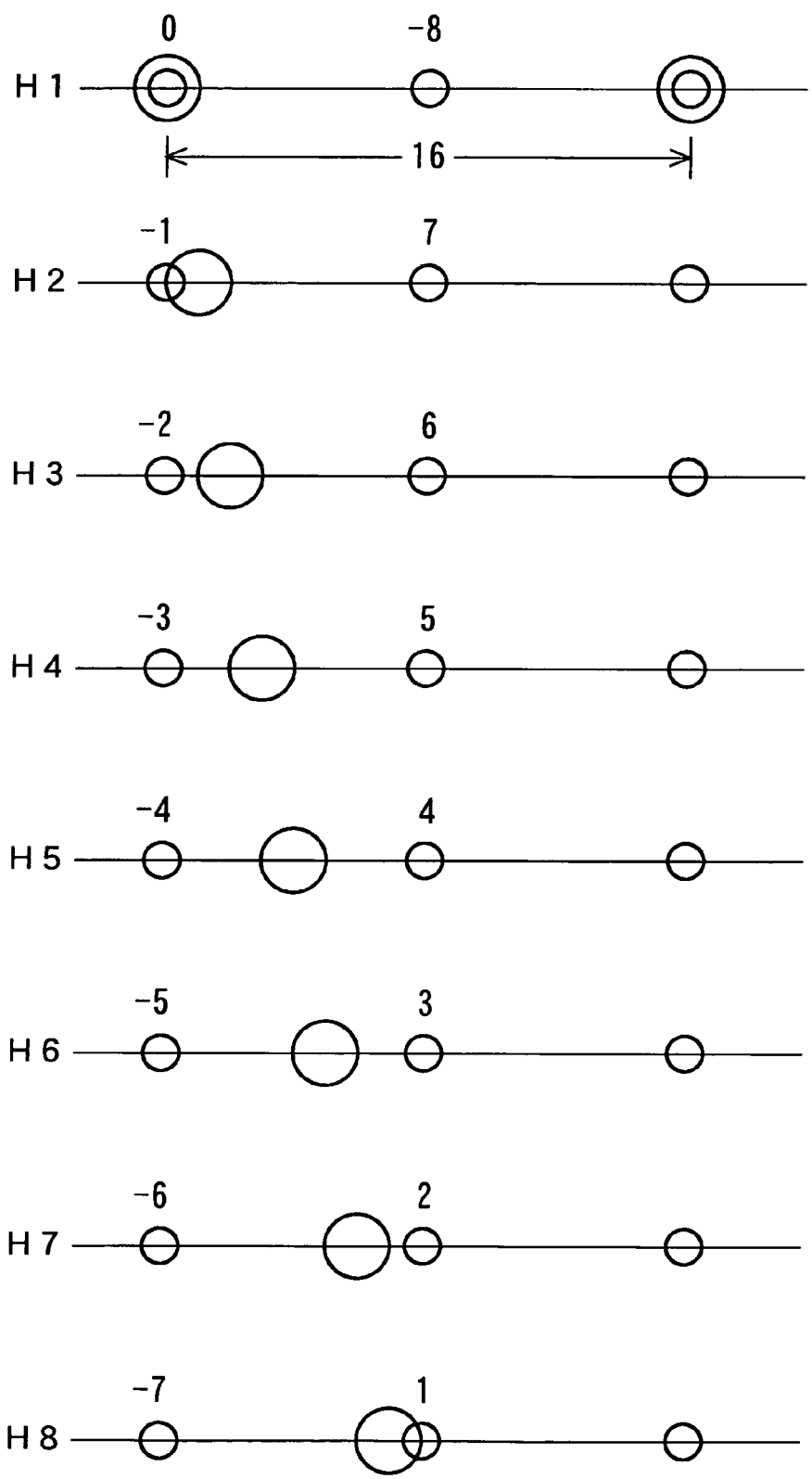
FIG. 12 is an explanatory diagram of the eight-step phase shift in a horizontal direction.

FIG. 12 shows eight-step horizontal phase shifts H1-H8. In it, a horizontal inter-pixel spacing is supposed to be 16 and a rightward direction, to be positive.

State H1 assumes that the SD signal has a shift of 0, in which case the pixel of the HD signal has phases of 0 and −8 with respect to the pixel of the SD signal. State H2 assumes that the SD signal has a shift of 1, in which case the pixel of the HD signal has phases of 7 and −1 with respect to the pixel of the SD signal. State H3 assumes that the SD signal has a shift of 2, in which case the pixel of the HD signal has phases of 6 and −2 with respect to the pixel of the SD signal. State H4 assumes that the SD signal has a shift of 3, in which case the pixel of the HD signal has phases of 5 and −3 with respect to the pixel of the SD signal.

State H5 assumes that the SD signal has a shift of 4, in which case the pixel of the HD signal has phases of 4 and −4 with respect to the pixel of the SD signal. State H6 assumes that the SD signal has a shift of 5, in which case the pixel of the HD signal has phases of 3 and −5 with respect to the pixel of the SD signal. State H7 assumes that the SD signal has a shift of 6, in which case the pixel of the HD signal has phases of 2 and −6 with respect to the pixel of the SD signal. State H8 assumes that the SD signal has a shift of 7, in which case the pixel of the HD signal has phases of 1 and −7 with respect to the pixel of the SD signal.

Figure 13:
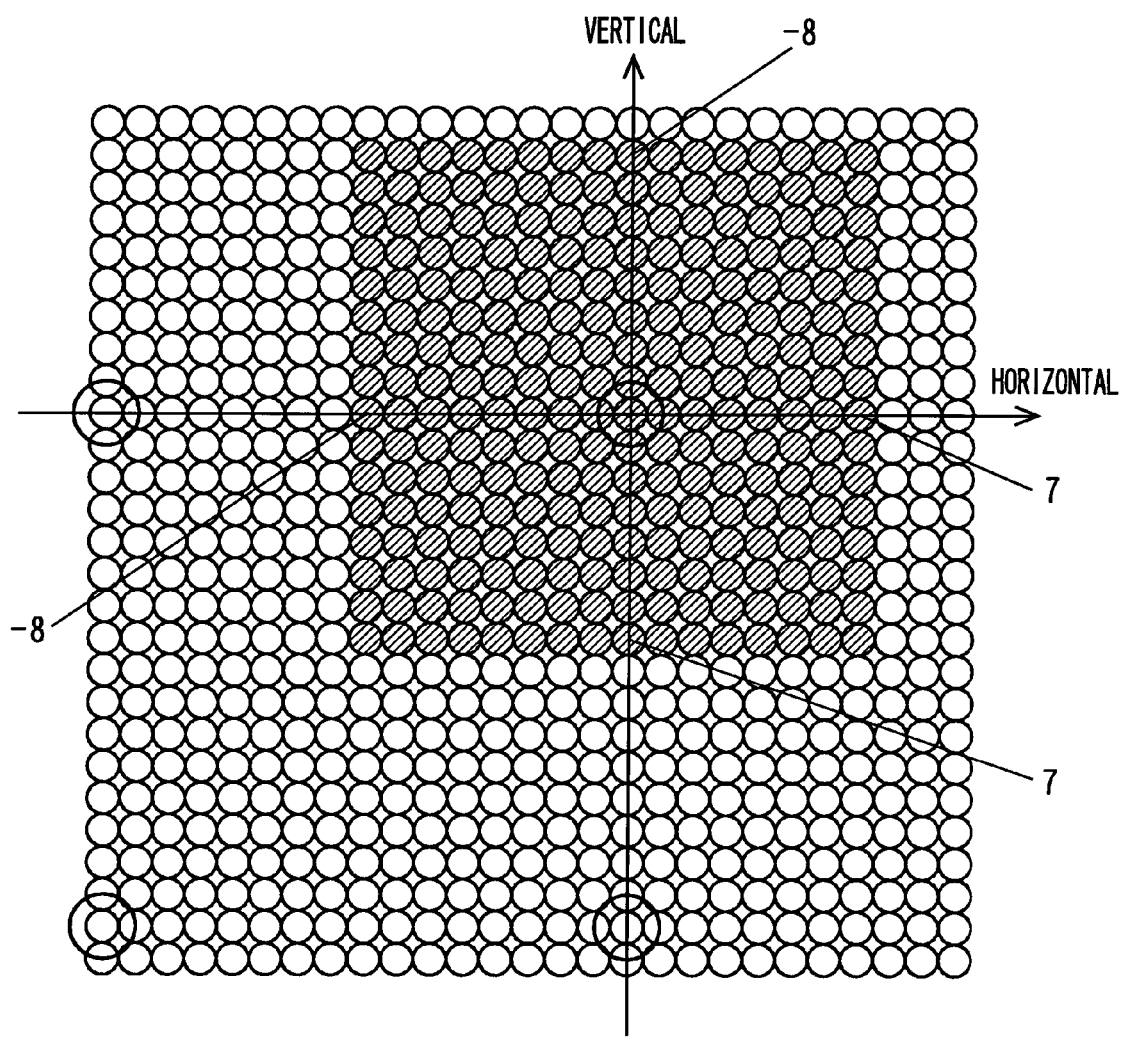
FIG. 13 is a diagram for showing a relationship in phase between the SD signal (525i signal) and the HD signal (1050i signal)

FIG. 13 shows phases of the HD signal with respect to the pixel, as a center, of 64 kinds of SD signals obtained by shifting the phase of the SD signal eight steps vertically and another eight steps horizontally as described above. That is, with respect to the pixel of the SD signals, the pixel of the HD signal has phases indicated by • in the figure.

In the present embodiment, as a method for shifting the phase, such a method is employed as to extract only a desired phase through an over-sampling filter. In the present embodiment, for example, in adjustment of a resolution and a noise suppression degree as the above-described image quality adjustment, by changing a frequency response of this over-sampling filter, student images with different resolutions can be created. By using the student images with the different resolutions, coefficients having different resolution improving effects can be created. For example, if there are the student image with a large degree of blur and the student image with a small degree of blur, through learning by use of the student image with a large degree of blur and that by use of the student image with a small degree of blur, a coefficient having large resolution improving effects and that with small resolution improving effects are produced respectively.

Furthermore, by adding noise to each of the student images with different resolutions, noise-added student images can be created. By varying an amount of noise to be added, the student images with different amounts of noise are created, thus creating coefficients having different noise suppressing effects. For example, if there are the student image with a large amount of noise and the student image with a small amount of noise, through learning by use of the student image with the large amount of noise and that by use of the student image with the small amount of noise, a coefficient having large noise suppressing effects and that with small noise suppressing effects are created respectively.

The amount of noise to be added is adjusted by varying G when adding noise n to a pixel value x of a student image to produce a noise-added pixel value x' of the student image as indicated in Equation (14).

$$x' = x + G \cdot n \qquad (14)$$

Figure 14:
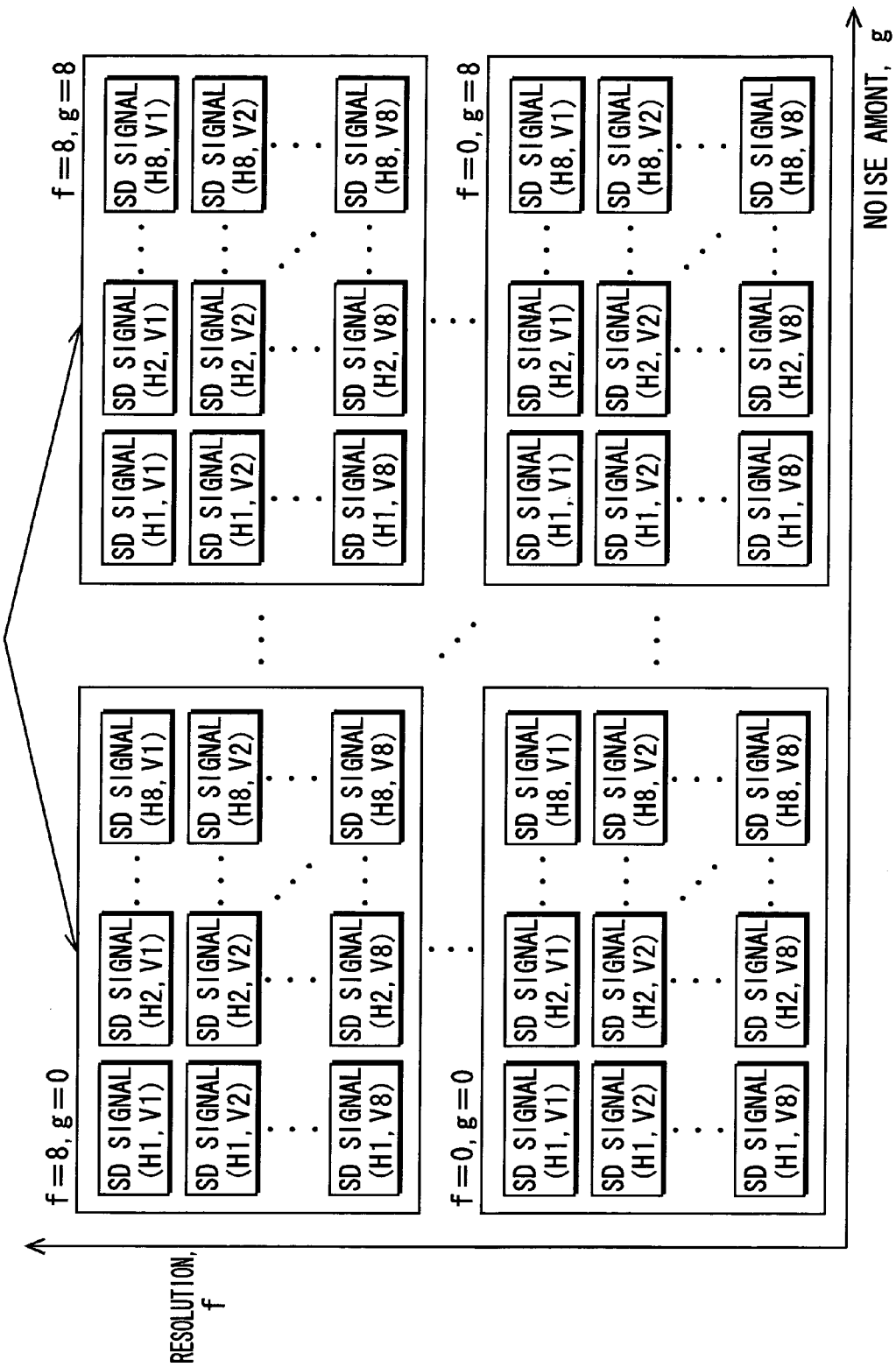
FIG. 14 is a diagram for showing one example of a method for producing the coefficient seed data.

FIG. 14 shows a concept of a final learning couple. In the present embodiment, for example, it is assumed that the over-sampling filter has frequency responses that are different in eight steps and noise is added in eight steps. Through learning by use of the student image having individual frequency responses, coefficient data in accordance with resolution adjustment is created and through learning by use of student images to which individual amounts of noise are added, coefficient data that accommodates noise suppression degree adjustment is created. Furthermore, by learning the individual frequency responses and added amounts of noise by using student images with different phases, coefficient data for producing pixels that correspond to the different phases is created.

Figure 15:
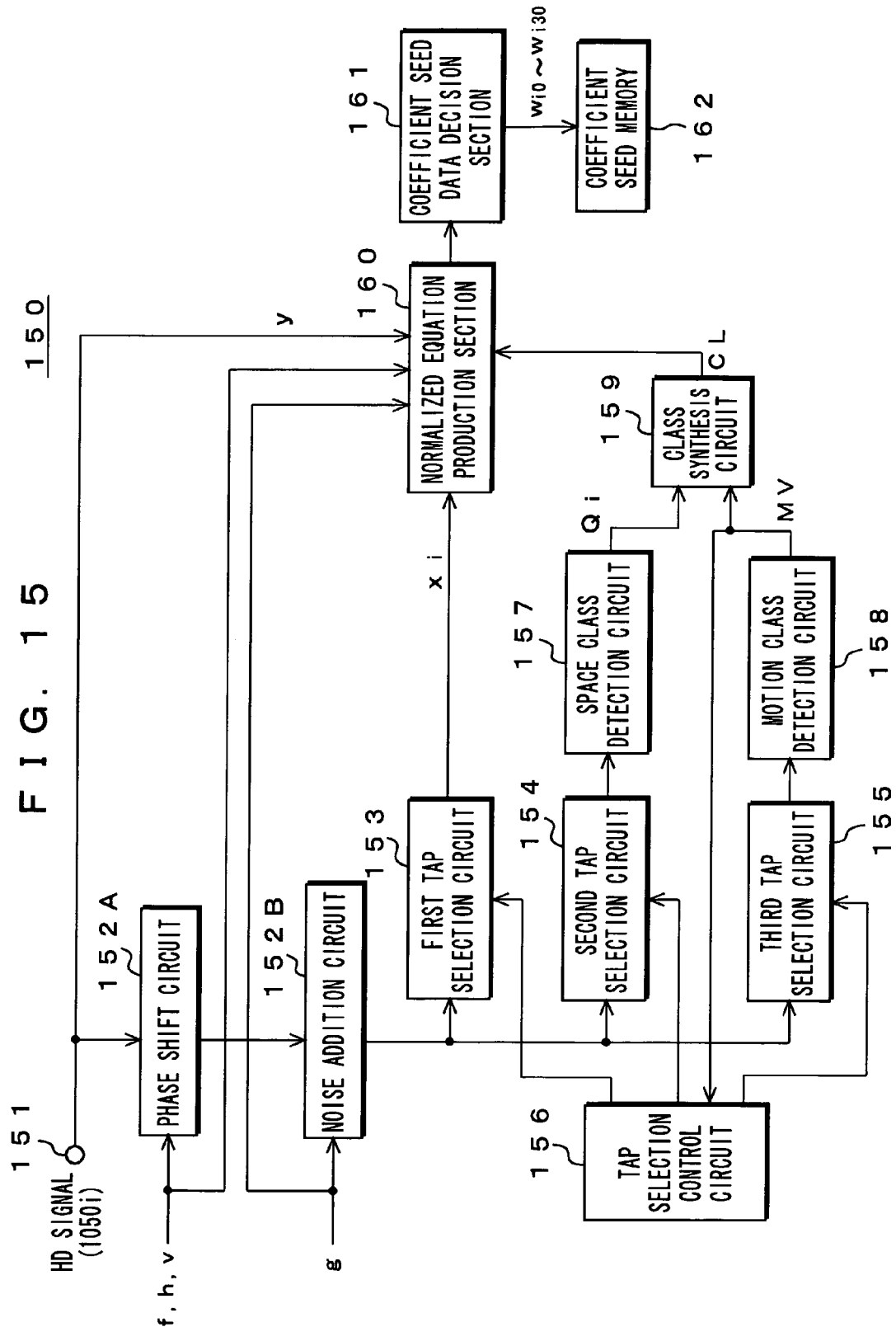
FIG. 15 is a block diagram of a configuration of a coefficient seed data production device.

FIG. 15 shows a configuration of a coefficient seed data production device 150 for producing coefficient seed data based on the above-described concept.

This coefficient seed data production device 150 has an input terminal 151 to which an HD signal (1050i signal) as a teacher signal is input, a phase shift circuit 152 A for applying over-sampling filtering on this HD signal in horizontal and vertical directions to extract a desired phase so that an SD signal may be obtained, and a noise addition circuit 152B for adding noise to this SD signal.

The phase shift circuit 152A is supplied with a parameter f that specifies a frequency response of the over-sampling filter and parameters h and v that specify horizontal and vertical phase shifts respectively. The noise addition circuit 152B is supplied with a parameter g that specifies a percentage of noise to be added. It is to be noted that the parameter f corresponds to the resolution adjustment information f in the image-signal-processing section 110 of FIG. 1, the parameters h and v correspond to the phase information h and v in the image-signal-processing section 110 of FIG. 1, and the parameter g corresponds to the noise suppression degree adjustment information g in the image-signal-processing section 110 of FIG. 1.

The coefficient seed data production device 150 further has first through third tap selection circuits 153-155 for selectively taking out and outputting plural items of SD pixel data located in a periphery of a target position in the HD signal, from SD signal output from the noise addition circuit 152B.

Those thirst through third tap selection circuits 153-155 are configured the same way as the first through third tap selection circuits 121-123 of the above-described image-signal-processing sections respectively. Taps to be selected by these first through third tap selection circuits 153-155 are specified by tap position information from a tap selection control circuit 156. Further, the tap selection control circuit 156 is supplied with class information MV of a motion class output from a motion class detection circuit 158, which will be described later.

The coefficient seed data production device 150 further has a space class detection circuit 157, the motion class detection circuit 158, and a class synthesis circuit 159, which are the same as the space class detection circuit 124, the motion class detection circuit 125, and the class synthesis circuit 126 in the above-described image-signal-processing section 110, respectively. The space class detection circuit 157 and the motion class detection circuit 158 receive, as an input, tap data (pixel data) taken out from the second and third tap selection circuits respectively.

The coefficient seed data production device 150 further has a normalized equation production section 160. This normalized equation production section 160 produces a normalized equation (see Equation (13)) required to obtain coefficient seed data $w_{i0}$ through $w_{i30}$ (i=1 to n) for each class, by using each HD pixel data y as target position data obtained from the HD signal supplied to the input terminal 151, data xi of a prediction tap selectively taken out by the first tap selection circuit 153 corresponding to each HD pixel data y, a class code CL output from the class synthesis circuit 159 corresponding to each HD pixel data y, and the parameters f, g, h, and V.

It is to be noted that, as described above, the parameter f specifies a frequency response of the over-sampling filter, the parameters h and v specify horizontal and vertical phase shifts respectively, and the parameter g specifies a noise addition percentage.

In this case, one item of HD pixel data y and the corresponding n items of prediction tap pixel data are combined to produce learning data. The parameters f, h, and v to be applied to the phase shift circuit 152A and the parameter g to be applied to the noise addition circuit 152B are changed sequentially, to produce the corresponding SD signals sequentially. In such a manner, the normalized equation production section 160 produces a normalized equation in which a number of items of learning data are registered. By thus producing the SD signals sequentially and registering the learning data, it is possible to determine coefficient seed data required to obtain pixel data having arbitrary resolution, noise suppression degree, and horizontal and vertical phases.

The coefficient seed data production device 150 further has a coefficient seed data decision section 161 which is supplied with data of a normalized equation generated by the normalized equation production section 160 for each class to solve the normalized equation for each class so that the coefficient seed data $w_{i0}$ through $w_{i30}$ of each class may be obtained, and a coefficient seed memory 162 for storing those obtained coefficient seed data $w_{i0}$ through $w_{i30}$.

The following will describe operations of the coefficient seed data production device 150 shown in FIG. 15. The input terminal 151 is supplied with an HD signal (1050i signal) as a teacher signal. Over-sampling filtering is applied by the phase shift circuit 152A on this HD signal in horizontal and vertical directions to extract a desired phase, thereby obtaining SD signals. In this case, these sequentially produced SD signals have been shifted in eight steps vertically and another eight steps horizontally.

Further, the parameter f input to the phase shift circuit 152A and the parameter g input to the noise addition circuit 152B are sequentially changed for the SD signal having each phase, thus producing the corresponding SD signals sequentially.

From each of the SD signals output from the noise addition circuit 152 B, the second tap selection circuit 154 selectively takes out data (SD pixel data) of a space class tap located in a periphery of a target position in the HD signal. This second tap selection circuit 154 selects a tap based on tap position information that corresponds to motion class information MV supplied from the tap selection control circuit 156.

The data (SD pixel data) of the space class tap taken out selectively by this second tap selection circuit 154 is supplied to the space class detection circuit 157. This class tap detection circuit 157 performs ADRC processing on each SD pixel data as data of the space class tap, to obtain a re-quantization code Qi as class information of a space class (see Equation (1)).

Further, from each of the SD signals output from the noise addition circuit 152 B, the third tap selection circuit 155 selectively takes out data (SD pixel data) of a motion class tap located in a periphery of the target position in the HD signal. In this case, the third tap selection circuit 155 selects a tap based on tap position information supplied from the tap selection control circuit 156.

The data (SD pixel data) of the motion class tap taken out selectively by this third tap selection circuit 155 is supplied to the motion class detection circuit 158. This motion class detection circuit 158 obtains class information MV of a motion class from each SD pixel data as the data of the motion class tap.

This motion information MV and the above-described re-quantization code Qi are supplied to the class synthesis circuit 159. This class synthesis circuit 159 obtains a class code CL that indicates a class to which a target pixel related to the HD signal belongs, from these motion information MV and re-quantization code Qi (see Equation (3)).

Further, from each of the SD signals output from the noise addition circuit 152B, the first tap selection circuit 153 selectively takes out data (SD pixel data) of a prediction tap located in a periphery of the target position in the HD signal. In this case, the first tap selection circuit 153 selects a tap based on the tap position information supplied from the tap selection control circuit 156.

The normalized equation production section 160 produces a normalized equation required to obtain coefficient seed data $w_{i0}$ through $w_{i30}$ (i=1 to n) for each class, by using each HD pixel data y as target position data obtained from the HD signal supplied to the input terminal 151, data (SD pixel data) xi of a prediction tap selectively taken out by the first tap selection circuit 153 corresponding to each HD pixel data y, a class code CL output from the class synthesis circuit 159 corresponding to each HD pixel data y, and the parameters f, h, v, and g.

That normalized equation is solved by the coefficient seed data decision section 161 to obtain coefficient data $w_{i0}$ through $w_{i30}$ for each class, which coefficient seed data $w_{i0}$ through $w_{i30}$ is stored in the coefficient seed memory 162, in which addresses are divided by the classes.

Is it thus possible in the coefficient seed data production device 150 shown in FIG. 15 to produce coefficient seed data $w_{i0}$ through $w_{i30}$ of each class, which is stored in the information memory bank 135 in the image-signal-processing section 110 shown in FIG. 1.

It is to be noted that the coefficient seed data production device 150 shown in FIG. 15 sequentially changes values of the parameter f that specifies a frequency response of the over-sampling filter, the parameter g that specifies a noise addition percentage, and the parameters h and v that specify horizontal and vertical phase shifts, to create a normalized equation in which a lot of items of learning data is registered, thereby obtaining coefficient seed data $w_{i0}$ through $w_{i30}$ for each class at a time.

According to another method for obtaining the coefficient seed data $w_{i0}$ through $w_{i30}$, learning is conducted on each of the SD signals produced by combinations of the parameters f, g, h, and v, to individually obtain coefficient data Wi that corresponds to each of these combinations first. This individually obtained coefficient data Wi may be used as teacher data, to employ the least squares method using Equation (7) as a variable so that the relationship of Equation (5) may be satisfied, thereby determining the coefficient seed data $w_{i0}$ through $w_{i30}$.

Figure 16:
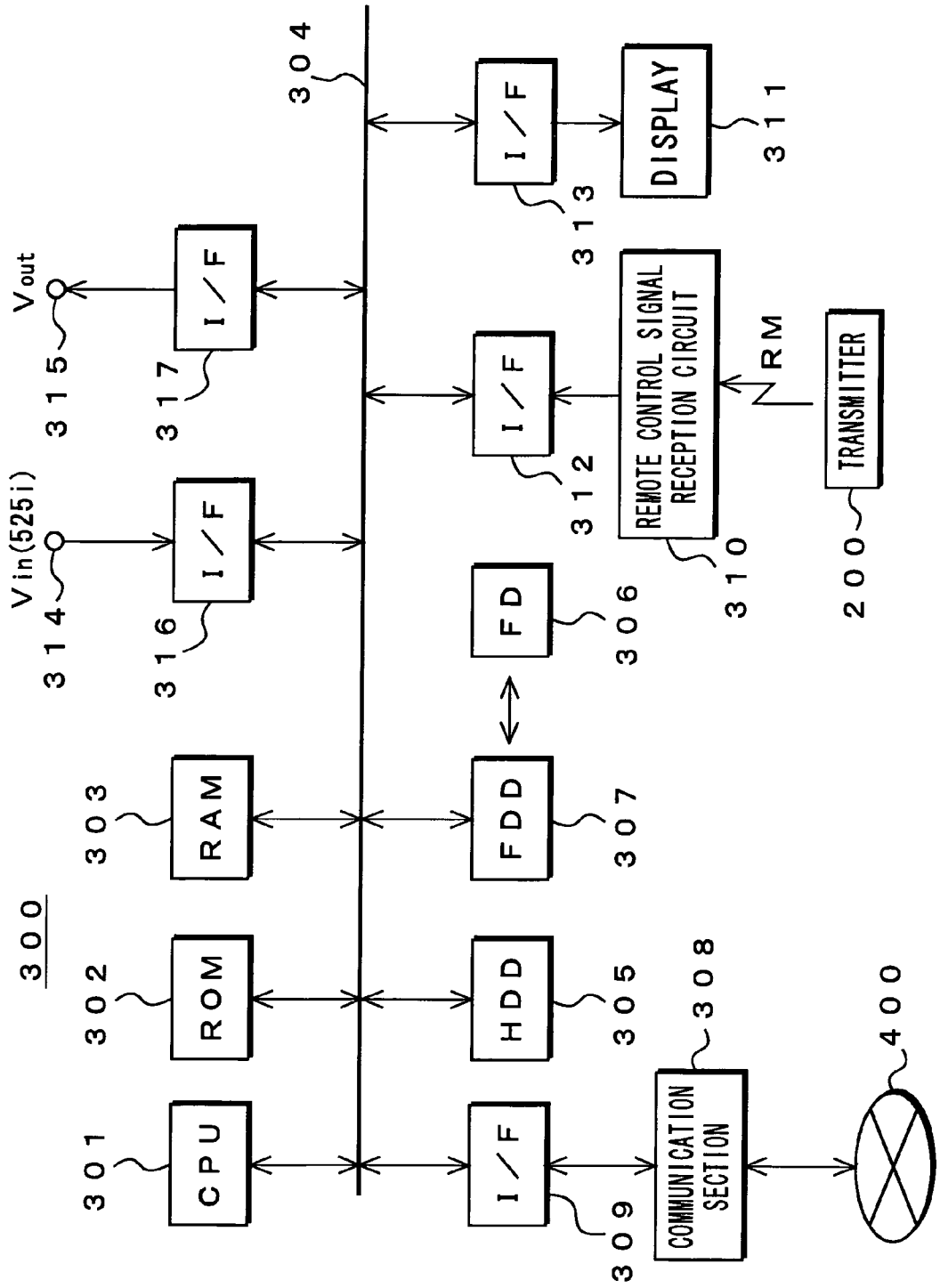
FIG. 16 is a block diagram of a software-implemented a) configuration of an image-signal-processing device.

It is to be noted that the processing in the image-signal-processing section 110 of FIG. 1 may be realized by software by using an image-signal-processing device 300 as shown in FIG. 16, for example.

First, the image-signal-processing device 300 shown in FIG. 16 will be described. This image-signal-processing device 300 has a CPU301 for controlling operations of the entire device, a read only memory (ROM) 302 in which an operation program of this CPU301, coefficient seed data, etc. are stored, and a random access memory (RAM) 303 that constitutes a working space for the CPU301. These CPU301, ROM302, and RAM303 are each connected to a bus 304.

The image-signal-processing device 300 further has a hard disk drive (HDD) 305 serving as an external storage device and a floppy (R) disk drive (FDD) 307 for driving a floppy (R) disk 306. These drives 305 and 307 are each connected to the bus 304.

The image-signal-processing device 300 further has a communication section 308 that connects to a communication network 400 such as the Internet etc. in a wired or wireless manner. This communication section 308 is connected to the bus 304 via an interface 309.

The image-signal-processing device 300 is further equipped with a user interface section. This user interface section has a remote control signal reception circuit 310 for receiving the remote control signal RM from the remote-controlled transmitter 200 and a display 311 constituted of a liquid crystal display (LCD) etc. The reception circuit 310 is connected to the bus 304 via an interface 312 and, similarly the display 311 is connected to the bus 304 via an interface 313.

The image-signal-processing device 300 further has an input terminal 314 for inputting a 525i signal as the input image signal Vin and an output terminal 315 for outputting the output image signal Vout. The input terminal 314 is connected to the bus 304 via an interface 316 and, similarly the output terminal 315 is connected to the bus 304 via an interface 317.

It is to be noted that the processing program, the coefficient seed data, etc., instead of being stored in the ROM302 beforehand as described above, may be downloaded via the communication section 308 from a communication network 400 such as the Internet, for example, and accumulated in a hard disk or the RAM303 so that it may be used. Further, these processing program, coefficient seed data, etc. may be provided in the floppy (R) disk 306.

Further, the 525i signal as the input image signal Vin, instead of being input from the input terminal 314, may be recorded in a hard disk beforehand or downloaded via the communication section 308 from the communication network such as the Internet. Further, instead of outputting the output image signal Vout to the output terminal 315 or concurrently with doing so, the output image signal Vout may be supplied to the display 311 to display an image, or further be stored in a hard disk or sent via the communication section 308 to the communication network 400 such as the Internet.

Figure 17:
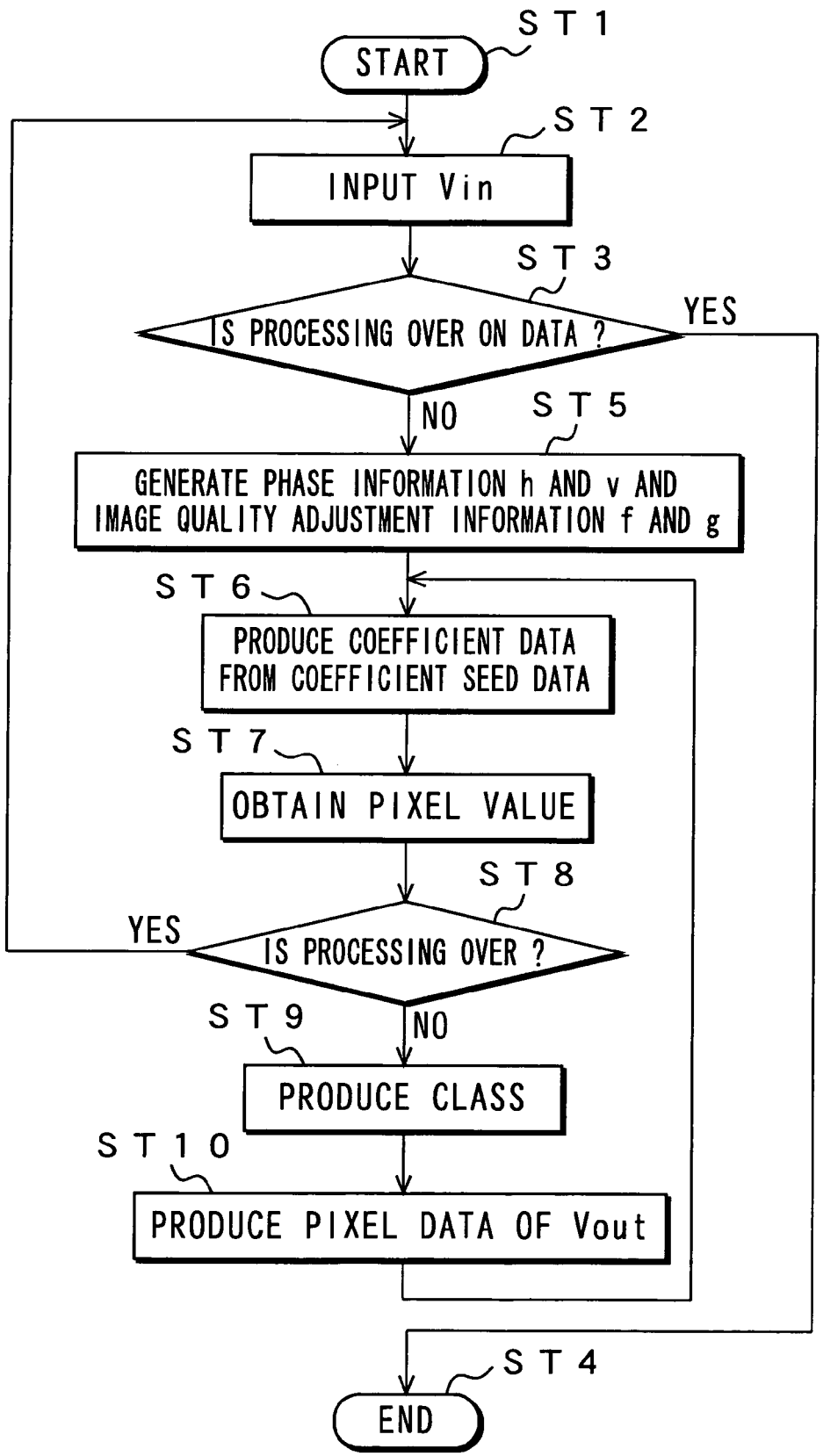
FIG. 17 is a flowchart of a procedure for processing an image signal.

The following will describe a processing procedure for obtaining the output image signal Vout from the input image signal Vin in the image-signal-processing device 300 shown in FIG. 16, with reference to a flowchart of FIG. 17.

First, at step ST1, the process starts and, at step ST2, inputs a predetermined frame or a predetermined field of the input image signal Vin. If this input image signal Vin is input from the input terminal 314, pixel data that constitutes this input image signal Vin is stored in the RAM303 temporarily. If this input image signal Vin is recorded in a hard disk, on the other hand, this input image signal Vin is read by the hard disk drive 305, to store the pixel data that constitutes this input image signal Vin in the RAM303 temporarily. At step ST3, the process decides whether processing is over on all frames or all fields of the input image signal Vin. If such is the case, the process ends the processing at step ST4. Otherwise, the process goes to step ST5.

At this step ST5, the process generates phase information h and v of each pixel in each unit pixel block that constitutes the output image signal Vout by using values of the corresponding information n/m of the number of pixels in each of the vertical and horizontal fields in the input image signal Vin and the output image signal Vout corresponding to an expansion rate of an image. The phase information h and v is generated by using a table stored in, for example, the ROM302.

Then, the ordinary mode or the zoom mode is set by the user operation on the remote-controlled transmitter 200. In the ordinary mode, the expansion rate of the image in each field is fixed to 1.

In the zoom mode, on the other hand, the image expansion rate is consecutively converted at a predetermined rate in each frame or field, corresponding to which the processing range RG of the input image signal Vin changes. This processing range RG includes the zoom center point P0 always and horizontal and vertical internal ratios of this zoom center point P0 are set so as to be the same as those of the zoom center point P0 in the entire range of the input image signal Vin. A plurality of unit pixel blocks of the output image signal Vout is arranged orderly in a mesh shape in the processing range RG. Further, in the zoom mode, in each frame or field, the phase information h and v is generated in such a manner that phases of produced pixels that correspond to the zoom center point P0 may be the same always.

Further, at step ST5, for example, for each of the unit pixel blocks of the output image signal Vout, the process obtains motion information and a dynamic range based on plural items of pixel data of the input image signal Vin located in a periphery of each of these unit pixel blocks and, based on the information and an image expansion rate and its change rate, generates image quality adjustment information f and g (see FIGS. 6A-8C). The image quality adjustment information f and g is generated by using a table stored in the ROM302 for example.

At step ST6, the process uses the phase information h and v of each of the pixels in the unit pixel block, the image quality adjustment information f and g that corresponds to the unit pixel block, and coefficient seed data of each class, to produce coefficient data Wi for an estimate equation (see Equation (4)) of each class by using a production equation (e.g., Equation (5)) corresponding to each of the pixels in the unit pixel block.

Next, at step ST7, the process obtains pixel data of a class tap and pixel data of prediction tap from pixel data of the input image signal Vin input at step ST2 corresponding to the unit pixel block that constitutes an output image signal Vout to be created. At step ST8, the process decides whether the processing is over in a processing range of each field of the input image signal Vin input at step ST2. If such is the case, the process returns to step ST2, to shift to processing of inputting the next predetermined frame or field of the input image signal Vin. Otherwise, the process goes to step ST9.

At step ST9, the process produces a class code CL from the pixel data of the class tap obtained at step ST7. At step ST10, the process uses the coefficient data Wi that corresponds to this class code CL and the pixel data of the prediction tap, to produce data of each pixel in the unit pixel block that constitutes the output image signal Vout by using the estimate equation and then returns to step ST6 to shift to the processing of the next unit pixel block.

By thus performing the processing along the flowchart of FIG. 17, it is possible to obtain the pixel data of the output image signal Vout through processing of the pixel data of the input image signal Vin that has been input. As described above, the output image signal thus obtained through the processing is output to the output terminal 315 or supplied to the display 311 so that an image may be displayed or supplied to the hard disk drive 305 to be recorded in a hard disk.

Further, the processing in the coefficient seed data production device 150 of FIG. 15 can be realized by software, a processing device for which is not shown in it though.

Figure 18:
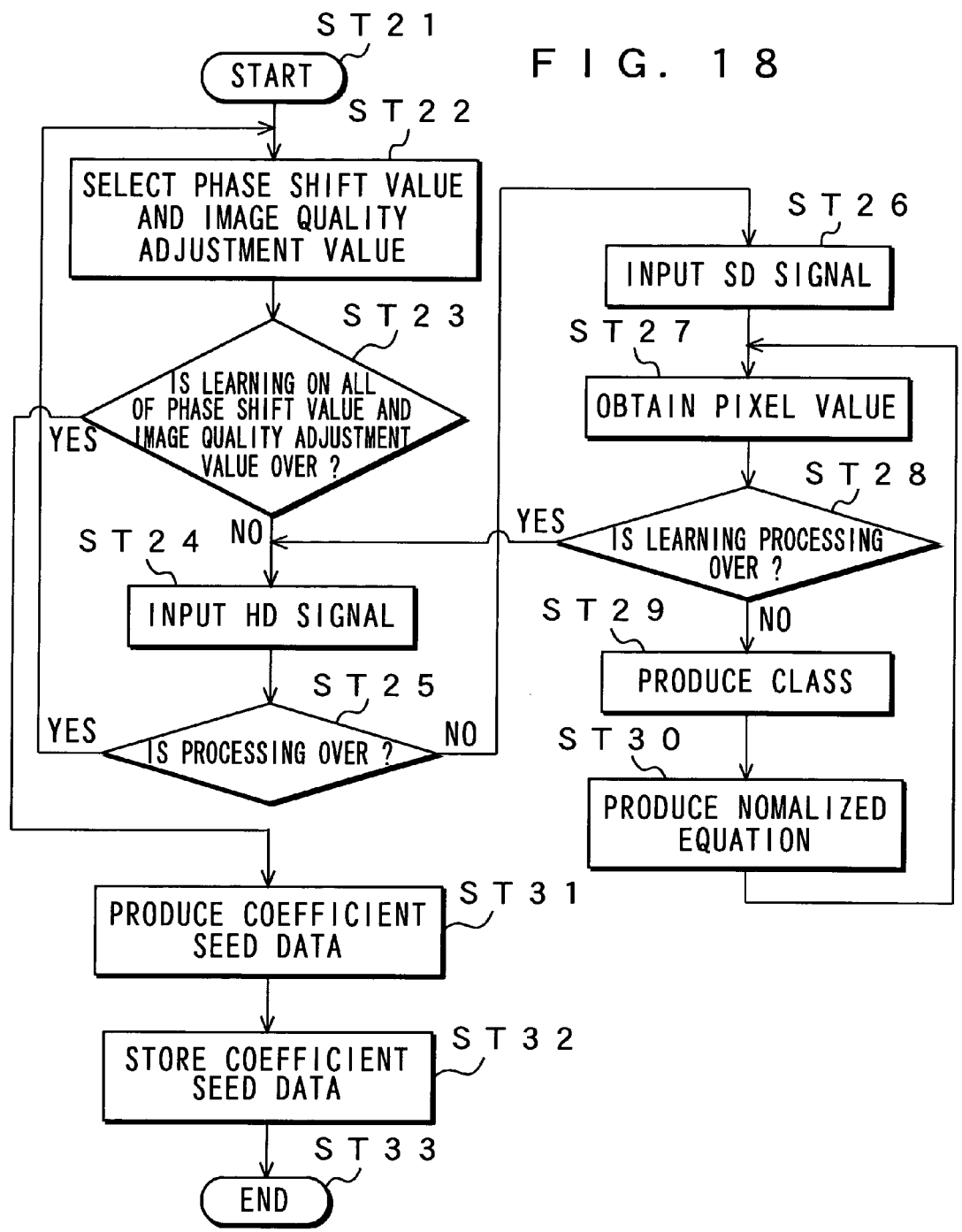
FIG. 18 is a flowchart of a procedure for producing coefficient seed data.

The following will describe a processing procedure for producing coefficient seed data with reference to a flowchart of FIG. 18.

First, at step ST21, the process starts and, at step ST22, selects a phase shift value (which is specified by, for example, parameters h and v) of an SD signal and an image quality adjustment value (which is specified by, for example, parameters f and g) that are used in learning. At step ST23, the process decides whether the learning is over on all combinations of the phase shift value and the image quality adjustment value. If such is not the case, the process goes to step ST24.

At this step ST24, the process inputs one frame or field of a known HD signal. At step ST25, the process decides whether processing is over completely on all the frames or fields of the HD signal. If such is the case, the process returns to step ST22 to select the next phase shift value and image quality adjustment value and repeat the above processing. Otherwise, the process goes to step ST26.

At this step ST26, the process produces an SD signal that is shifted in phase from the HD signal input at step ST24 by the phase shift value selected at step ST22 and that is image-quality adjusted (in terms of resolution and noise) in accordance with the image quality adjustment value selected at step ST22. At step ST27, the process obtains pixel data of a class tap and a prediction tap from the SD signal produced at step ST26 corresponding to the HD pixel data. At step ST28, the process decides whether the learning processing is over on all ranges of the HD signal input at step ST24. If such is the case, the process returns to step ST24 to input the next one frame or field of the HD signal and repeat the above processing and, otherwise, goes to step ST29.

At step ST29, the process produces a class code CL from the SD pixel data of the class tap obtained at step ST27. At step ST30, the process produces a normalized equation (see Equation (13)). Then, the process returns to step ST27.

If it is decided at step ST23 that the learning is over on all of the combinations of the phase shift value and the image quality adjustment value, the process goes to step ST31. At this step ST31, the process solves the normalized equation by the sweeping-out method to calculate coefficient seed data of each class and, at step ST32, saves this coefficient seed data in the memory and then ends the processing at step ST33.

By thus performing the processing along the flowchart shown in FIG. 18, it is possible to obtain coefficient seed data of each class by using the same method as the coefficient seed data production device 150 shown in FIG. 15.

Although in the above embodiment, the class information MV and the dynamic range DR have been used as characteristics information extracted from plural items of pixel data of the input image signal Vin located in a periphery of a target position in the output image signal Vout, any other characteristics information may be used separately from or together with it. The other information may be considered to contain space waveform information (which corresponds to the above-described class code Qi) obtained through ADRC processing on plural items of pixel data of the input image signal Vin, activity information obtained through processing of plural items of pixel data of the input image signal Vin, an average value of plural items of pixel data of the input image signal Vin, etc. For example, in the case of using the motion class information MV and the class code Qi, the image quality adjustment information generation circuit 140 may be supplied with a class synthesis circuit CL.

Further, in the above embodiment, coefficient seed data has been stored in the information memory bank 135 beforehand so that coefficient data Wi that corresponds to phase information h and v output from the phase information generation circuit 139 and image quality adjustment information f and g generated by the image quality adjustment information generation circuit 140 may be produced by the coefficient production circuit 136 based on a production equation of Equation (5) by using this coefficient seed data and used.

However, coefficient data for all combinations of the phase information h and v output from the phase information generation circuit 139 and the image quality adjustment information f and g generated by the image quality adjustment information generation circuit 140 may be stored in the information memory bank 135 so that coefficient data Wi that corresponds to the phase information h and v and the image quality adjustment information f and g can be read and used.

In this case, the coefficient data Wi for each of the combinations of the phase information h and v and the image quality adjustment information f and g that are stored in the information memory bank 135 can be obtained by conducting learning on each of the SD signals obtained for each of combinations of the parameters f, g, h, and v.

Although the above embodiment has used a linear equation of the first degree as an estimate equation used to produce pixel data of the output image signal Vout, the present invention is not limited to it; for example, an equation of higher degree may be used as the estimate equation.

Although the above embodiment has detected a class code CL so that coefficient data Wi that corresponds to this class code may be used, a section for detecting the class code CL may be omitted. In this case, only one kind of coefficient seed data is to be stored in the information memory bank 135.

Although the above embodiment has supplied the output image signal Vout provided from the image-signal-processing section 110 is provided to display section 111 so that an image due to this output image signal Vout may be displayed, this output image signal Vout may be supplied to a recording device such as a video tape recorder and recorded in it. In this case, it may be processed at the section of the post-processing circuit 129 so that it may have such an optimal data structure as to fit recording.

According to the present invention, when processing a first image signal to obtain a second image signal that is used to display an image whose expansion rate (image size) is changed consecutively, a quality of the image due to the second image signal is adjusted using image quality adjustment information generated on the basis of information related to at least the expansion rate of the image, thereby enabling improving the quality of a zoom image.

Industrial Applicability

An device for processing an image signal etc. related to the present invention improves a quality of a zoom image by performing image quality adjustment based on information related to an expansion rate and so can be applied to an image display apparatus such as a TV receiver that can display such a zoom image that the image expansion rate is changed consecutively.

The invention claimed is:

1. A device for processing an image signal and producing a second image signal to display an image with an expansion rate of the image being changed consecutively, based on a first image signal constituted of a plurality of items of pixel data, the device comprising:

phase information generation means for generating phase information of a target position in the second image signal that corresponds to each of the changed expansion rates;

pixel data production means for producing pixel data of the target position in the second image signal, in accordance with the phase information generated by the phase information generation means; and image quality adjustment means for adjusting a quality of the image due to the second image signal by using image quality adjustment information generated based on information related to at least the expansion rate of the image.

2. The device for processing an image signal according to claim 1, wherein the quality of the image is a resolution.

3. The device for processing an image signal according to claim 1, wherein the quality of the image is a noise suppression degree.

4. The device for processing an image signal according to claim 1, wherein the information related to the expansion rate of the image is a change rate of the expansion rate.

5. The device for processing an image signal according to claim 1, wherein the information related to the expansion rate of the image is the expansion rate of the image.

6. The device for processing an image signal according to claim 1, wherein the image quality adjustment means further adjusts a quality of an image due to pixel data of the target position in the second image signal by using the image quality adjustment information generated based on characteristics information extracted from the plurality of items of pixel data of the first image signal located in a periphery of the target position in the second image signal.

7. The device for processing an image signal according to claim 1, wherein the characteristics information is a dynamic range that is a difference between a maximum value and a minimum value among the plurality of items of pixel data of the first image signal.

8. The device for processing an image signal according to claim 1, wherein the characteristics information is movement information obtained by using a difference between items of the pixel data separated in a time direction from each other among the plurality of items of the pixel data of the first image signal.

9. The device for processing an image signal according to claim 1, wherein the characteristics information is space waveform information that indicates a level distribution of the plurality of items of the pixel data of the first image signal.

10. The device for processing an image signal according to claim 1, wherein the pixel data generation means comprises:

coefficient data generation means for generating coefficient data corresponding to phase information generated by the phase information generation means, said coefficient data being used in an estimate equation;

data selection means for selecting the plurality of items of pixel data located in a periphery of the target position of the second image signal, based on the first image signal; and calculation means for obtaining, by calculation, pixel data of the target position in the second image signal based on the estimate equation by using the coefficient data generated by the coefficient data generation means and the plurality of items of pixel data selected by the data selection means.

11. The device for processing an image signal according to claim 10, wherein the data selection means comprises first data selection means and further comprising:

second data selection means for selecting plural items of pixel data located in a periphery of the target position of the second image signal, based on said first image signal; and class detection means for detecting a class to which the pixel data of the target position in the second image signal belongs, based on the plurality of items of pixel data selected by the second data selection means, wherein the coefficient data generation means further generates coefficient data corresponding to the class detected by the class detection means, said coefficient data being used in the estimate equation.

12. The device for processing an image signal according to claim 10, wherein the coefficient data generation means comprises:

storage means for storing coefficient seed data, which is coefficient data in a production equation containing the phase information as a parameter, said production equation being used to produce the coefficient data, used in the estimate equation; and coefficient data production means for producing the coefficient data used in the estimate equation based on the production equation, by using the coefficient seed data stored in the storage means and the phase information generated by the phase information generation means.

13. The device for processing an image signal according to claim 12, wherein the production equation contains the image quality adjustment information as a parameter; and wherein the coefficient data production means further, produces coefficient data used in the estimate equation based on the production equation, by using the image quality adjustment information.

14. The device for processing an image signal according to claim 10, wherein the coefficient data generation means comprises:

storage means for storing coefficient data used in the estimate equation for each of the pieces of phase information that may be generated by the phase information generation means; and coefficient-data-reading means for reading coefficient data that corresponds to the phase information generated by the phase information generation means, from the storage means.

15. The device for processing an image signal according to claim 14, wherein the storage means further stores coefficient data used in the estimate equation for each combination of the phase information that may be generated by the phase information generation means and the image quality adjustment information that may be generated by the image quality adjustment means; and wherein the coefficient-data-reading means reads coefficient data corresponding to the phase information generated by the phase information generation means and the image quality adjustment information generated by the image quality adjustment means, from the storage-means.

16. A method for processing an image signal and producing a second image signal to display an image with an expansion rate of the image being changed consecutively, based on a first image signal constituted of a plurality of items of pixel data, the method comprising the steps of:

generating phase information of a target position in the second image signal, said phase information corresponding to each of the changed expansion rates;

producing pixel data of the target position in the second image signal, in accordance with the phase information generated by the phase information generation means; and adjusting a quality of the image due to the second image signal by using image quality adjustment information generated based on information related to at least the expansion rate of the image.

17. A computer-readable medium for recording a program that causes a computer to perform a method for processing an image signal and producing a second image signal to display an image with an expansion rate of the image being changed consecutively, based on a first image signal constituted of plurality of items of pixel data, the method comprising the steps of:

generating phase information of a target position in the second image signal, said phase information corresponding to each of the changed expansion rates;

producing pixel data of the target position in the second image signal, in accordance with the phase information generated by the phase information generation means; and adjusting a quality of the image due to the second image signal by using image quality adjustment information generated based on information related to at least the expansion rate of the image.

18. A program for causing a computer to perform a method for processing an image signal and producing a second image signal to display an image with an expansion rate of the image being changed consecutively, based on a first image signal constituted of plurality of items of pixel data, the method comprising the steps of:

generating phase information of a target position in the second image signal, said phase information corresponding to each of the changed expansion rates;

producing pixel data of the target position in the second image signal, in accordance with the phase information generated by the phase information-generation means; and adjusting a quality of the image due to the second image signal by using image quality adjustment information generated based on information related to at least the expansion rate of the image.

* * * * *